United States Patent
He et al.

(10) Patent No.: US 11,831,859 B2
(45) Date of Patent: *Nov. 28, 2023

(54) PASSIVE THREE-DIMENSIONAL IMAGE SENSING BASED ON REFERENTIAL IMAGE BLURRING WITH SPOTTED REFERENCE ILLUMINATION

(71) Applicant: SHENZHEN GOODIX TECHNOLOGY CO., LTD., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 72 days.

This patent is subject to a terminal disclaimer.

(21) Appl. No.: 17/315,269

(22) Filed: May 8, 2021

(65) Prior Publication Data

US 2021/0352260 A1    Nov. 11, 2021

Related U.S. Application Data

(63) Continuation of application No. 17/314,047, filed on May 7, 2021.

(Continued)

(51) Int. Cl.
*H04N 13/271* (2018.01)
*H04N 13/236* (2018.01)
(Continued)

(52) U.S. Cl.
CPC .......... *H04N 13/271* (2018.05); *G02B 5/003* (2013.01); *G02B 5/201* (2013.01); *G06T 7/571* (2017.01);
(Continued)

(58) Field of Classification Search
CPC .... G02B 27/0075; G02B 5/003; G02B 5/201; G02B 7/36; G06T 2207/10028;
(Continued)

(56) References Cited

U.S. PATENT DOCUMENTS

2016/0269600 A1    9/2016   Wajs
2016/0286199 A1*   9/2016   Wajs ............ H04N 13/236
(Continued)

*Primary Examiner* — Christopher S Kelley
*Assistant Examiner* — Ana Picon-Feliciano
(74) *Attorney, Agent, or Firm* — KILPATRICK TOWNSEND & STOCKTON LLP

(57) ABSTRACT

Techniques are described for passive three-dimensional image sensing based on referential image blurring. For example, a filter mask is integrated with a lens assembly to provide one or more normal imaging bandpass (NIB) regions and one or more reference imaging bandpass (RIB) regions, the regions being optically distinguishable and corresponding to different focal lengths and/or different focal paths. As light rays from a scene object pass through the different regions of the filter mask, a sensor can detect first and second images responsive to those light rays focused through the NIB region and the RIB region, respectively (according to their respective focal lengths and/or respective focal paths). An amount of blurring between the images can be measured and correlated to an object distance for the scene object. Some embodiments project additional reference illumination to enhance blurring detection in the form of reference illumination flooding and/or spotted illumination.

20 Claims, 17 Drawing Sheets

Related U.S. Application Data

(60) Provisional application No. 63/026,109, filed on May 17, 2020, provisional application No. 63/022,407, filed on May 8, 2020.

(51) Int. Cl.
*H04N 13/254* (2018.01)
*H04N 13/211* (2018.01)
*G06T 7/571* (2017.01)
*H04N 13/207* (2018.01)
*G02B 5/00* (2006.01)
*G02B 5/20* (2006.01)
*H04M 1/02* (2006.01)
*H04N 13/00* (2018.01)

(52) U.S. Cl.
CPC ......... *H04N 13/207* (2018.05); *H04N 13/211* (2018.05); *H04N 13/236* (2018.05); *H04N 13/254* (2018.05); *G06T 2207/10028* (2013.01); *H04M 1/0264* (2013.01); *H04N 2013/0081* (2013.01)

(58) Field of Classification Search
CPC ... G06T 7/571; H04M 1/0264; H04N 13/207; H04N 13/211; H04N 13/236; H04N 13/254; H04N 13/271; H04N 2013/0081
USPC ...................................................... 348/49, 46
See application file for complete search history.

(56) References Cited

U.S. PATENT DOCUMENTS

| | | | |
|---|---|---|---|
| 2017/0230638 A1 | 8/2017 | Wajs et al. | |
| 2018/0010903 A1* | 1/2018 | Takao | ................... G01S 7/4816 |
| 2019/0188827 A1* | 6/2019 | Mitani | ............... H04N 5/23232 |

* cited by examiner

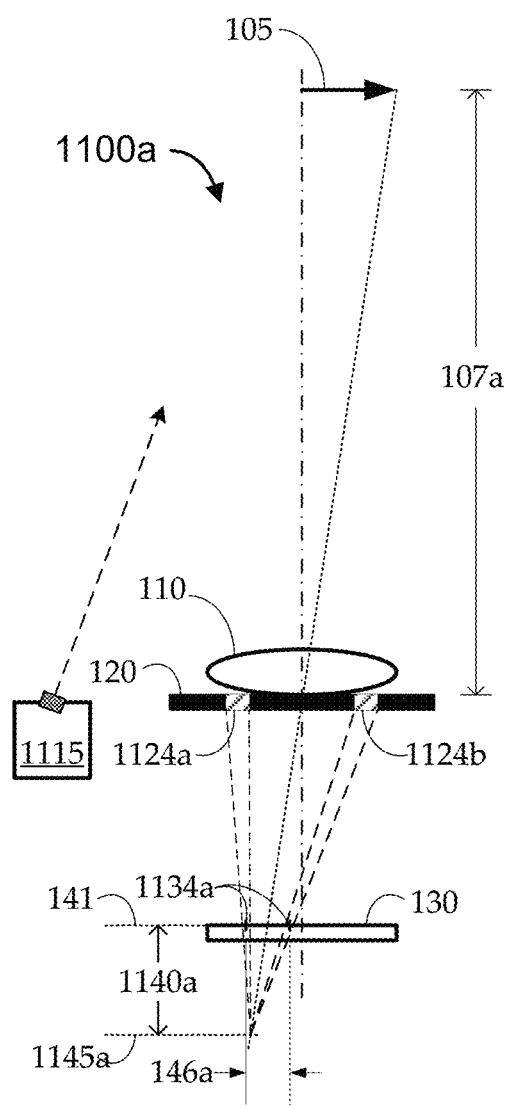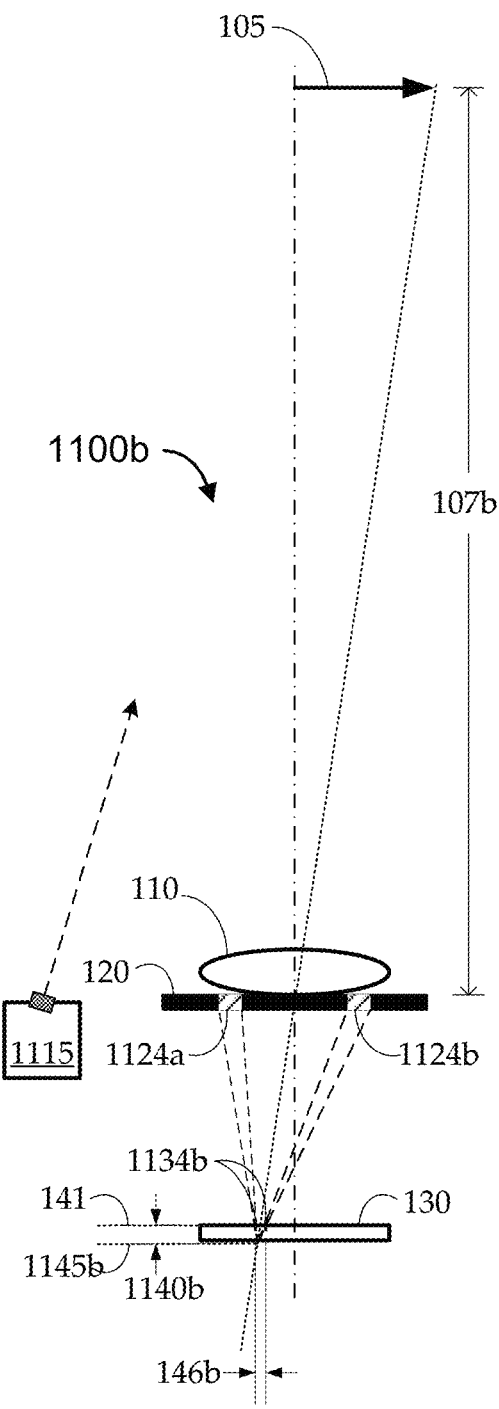
FIG. 11A  FIG. 11B

PASSIVE THREE-DIMENSIONAL IMAGE SENSING BASED ON REFERENTIAL IMAGE BLURRING WITH SPOTTED REFERENCE ILLUMINATION

CROSS-REFERENCES

This application is a continuation of U.S. patent application Ser. No. 17/314,047, for "PASSIVE THREE-DIMENSIONAL IMAGE SENSING BASED ON REFERENTIAL IMAGE BLURRING", filed on May 7, 2021, which claims priority from Provisional application No. 63/022,407, for "PASSIVE THREE-DIMENSIONAL IMAGE SENSING BASED ON REFERENTIAL IMAGE BLURRING", filed May 8, 2020, and claims priority from Provisional application No. 63/026,109, for "PASSIVE THREE-DIMENSIONAL IMAGE SENSING BASED ON REFERENTIAL IMAGE BLURRING WITH SPOTTED REFERENCE ILLUMINATION", filed on May 17, 2020, which are hereby incorporated by references in their entireties.

FIELD

The invention relates generally to optics integrated into personal electronic devices. More particularly, embodiments relate to passive three-dimensional image sensing based on referential image blurring, such as for depth mapping of a three-dimensional image space to support features of a smart phone camera system.

BACKGROUND

In the past, photography was a discipline reserved to those with specialized knowledge and equipment. Over the past decades, innovations in digital photographic hardware and software, and the worldwide spread of smartphones with integrated digital cameras, have placed digital photography at the fingertips of billions of consumers. In this environment of ubiquitous access to digital photography and videography, consumers increasingly desire to be able to quickly and easily capture moments using their smartphones. Advances in digital photography have included advances in capturing of three-dimensional information for various purposes. For example, capturing of depth and other three-dimensional information can support three-dimensional photography and videography, as well as advanced automation in focus, stabilization, aberration correction, and other features.

Depth information is typically captured using active techniques, such as time-of-fly techniques, or triangulation techniques. For example, focused light pulses can be transmitted, and their reflections can be subsequently received; and knowledge of various parameters (e.g., the speed of light) can be used to convert pulse receipt timing into a depth measurement. Conventionally, it has been difficult to integrate such time-of-fly and other techniques in portable digital electronics applications, such as smart phones. For example, some conventional approaches rely on separate optical systems, relatively large optics, and/or specialized illumination sources that do not fit within spatial limitations of many portable digital electronic applications; while other conventional approaches tend not to be reliable or accurate enough to support more advanced features.

BRIEF SUMMARY

Embodiments provide passive three-dimensional (3D) image sensing based on referential image blurring, such as for depth mapping of a 3D image space to support features of a smart phone camera system. For example, a filter mask is integrated with a lens assembly to provide one or more normal imaging bandpass (NIB) regions and one or more reference imaging bandpass (RIB) regions. The NIB and RIB regions of the filter mask are optically distinguishable (e.g., permissive of different frequencies, polarizations, etc.) and are configured in the lens assembly to have different focal lengths and/or different focal paths. As light rays from a scene object pass through the different regions of the filter mask, a sensor can detect first and second images responsive to those light rays focused through the NIB region and the RIB region, respectively (according to their respective focal lengths and/or respective focal paths). An amount of blurring between the images can be measured and correlated to an object distance for the scene object. Some embodiments project additional reference illumination to enhance blurring detection in the form of reference illumination flooding and/or spotted illumination.

BRIEF DESCRIPTION OF THE DRAWINGS

The accompanying drawings, referred to herein and constituting a part hereof, illustrate embodiments of the disclosure. The drawings together with the description serve to explain the principles of the invention.

FIGS. 11A and 11B show a passive 3D image sensing environment using spotted illumination, according to various embodiments.

Figure 1A:
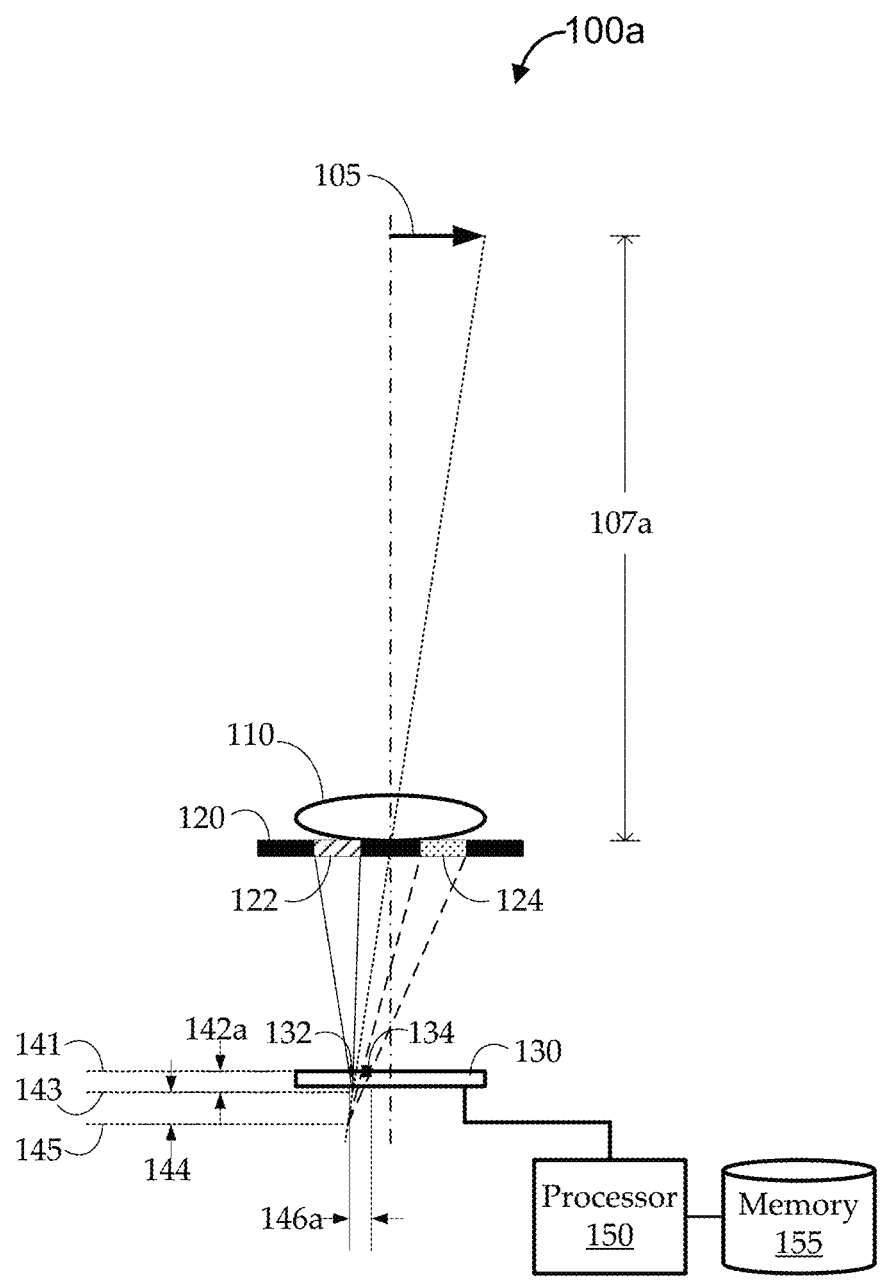
FIGS. 1A and 1B show a passive 3D image sensing environment, according to various embodiments.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Increasingly, digital imaging is exploiting depth information to support various features. For example, in three-dimensional (3D) computer graphics, depth maps are used to indicates information relating to the distance of the surfaces of scene objects from a viewpoint. Similarly, in digital photography, depth mapping, and the like, can be used to support 3D image capture features, enhanced auto-focusing features, and other features. Such digital 3D imaging is also being used to support platforms, such as 3D cameras, 3D robot vision, 3D vehicle mapping, etc. Conventionally, active techniques are used for acquiring such depth information. For example, so-called "time-of-fly" (TOF) techniques generally measure a distance of an object with respect to a reference point by emitting light beams towards an object, and measuring timing of reflections of the emitted light. With such techniques, distance can be computed by comparing the speed of light to the time it takes for the emitted light to be reflected back to the system. As another example, multiple structured light can be used to determine distance by transmitting multiple light beams in a manner that they converge and diverge at different distances. With such techniques, distance can be measured by separately imaging an object with each light beam, and comparing the images to determine a level of overlap, which can be correlated to distance. Such a technique is described in U.S. Pat. No. 10,489,925, titled "3D Sensing Technology Based on Multiple Structured Illumination."

Such conventional active techniques for 3D image sensing can be limited in various ways. One limitation is that the active illumination used by such conventional techniques can consume power and space, which may be limited in many applications, such as in smart phones and other portable electronic devices. Another limitation is that it can be difficult to dynamically calibrate such techniques to differences in ambient lighting, differences in how a detected object respond to illumination (e.g., based on the object's color, shape, reflectivity, etc.), and/or other differences between detection environments. Yet another limitation is that some such techniques rely on integrating additional optical systems into an environment with many physical and technical constraints.

Embodiments described herein provide novel techniques for 3D image sensing based on passive optical techniques, particularly involving referential imaging blurring. For example, a filter mask is integrated with a lens assembly to provide a normal imaging bandpass (NIB) region and a reference imaging bandpass (RIB) region. The NIB and RIB regions of the filter mask are optically distinguishable (e.g., permissive of different frequencies, polarizations, etc.) and are configured in the lens assembly to have different focal lengths. As light rays from a scene object pass through the different regions of the filter mask, a sensor can detect first and second images responsive to those light rays focused through the NIB region and the RIB region, respectively (according to their respective focal lengths). An amount of blurring between the images can be measured and correlated to an object distance for the scene object.

Figure 1B:
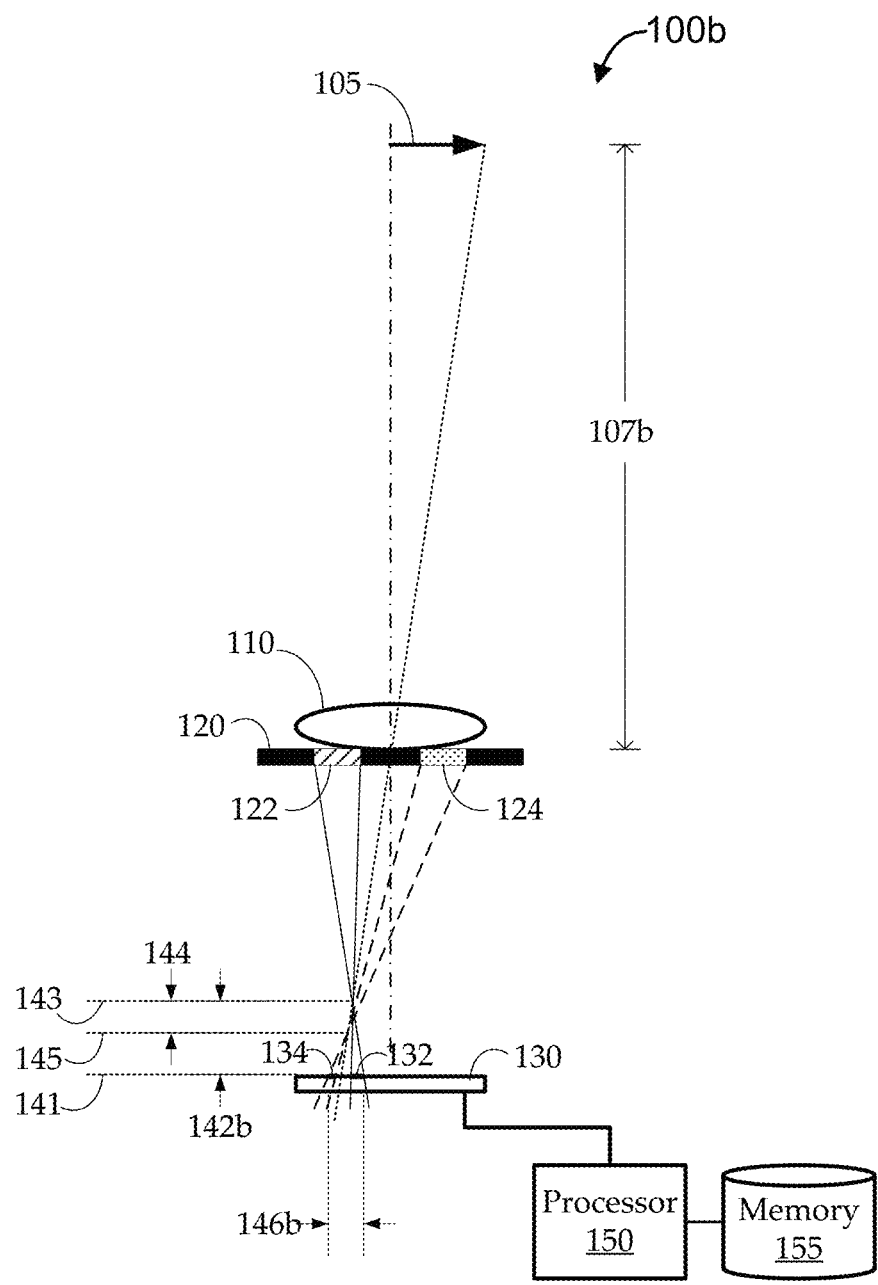

Turning first to FIGS. 1A and 1B, a passive 3D image sensing environment 100 is shown, according to various embodiments. The environment 100 includes a lens assembly 110, an image sensor 130, a filter mask 120, and a processor 150. The lens assembly 110 can include the filter mask 120. For example, while the filter mask 120 is shown in FIGS. 1A and 1B as adjacent to a single convex lens, the lens assembly 110 can includes a number of discrete lens components (e.g., convex and/or convex lenses, mirrors, etc.) with the filter mask 120 disposed among the components (e.g., at a common aperture stop). Further, the lens assembly 110 can include additional elements, such as a mechanical aperture.

Embodiments of the filter mask 120 include a normal imaging bandpass (NIB) region 122 and a reference imaging bandpass (RIB) region 124 separate from the NIB region. The NIB region 122 and the RIB region 124 pass through light components that are optically distinguishable in any suitable manner. As used herein, "light components," and the like refer generally to components of received optical information that are distinguishable by physical and/or digital filtering, such as polarization, frequency (e.g., color), brightness, etc. In one implementation, the NIB region 122 permits visible-spectrum light to pass through, while the RIB region 124 permits non-visible spectrum light to pass through. For example, the NIB region 122 is substantially transparent to light in the red-green-blue spectrum, while limiting transmission of some or all light outside that spectrum (e.g., the NIB region 122 is substantially opaque to light in the near-infrared spectrum); and the RIB region 124 passes through light in the near-infrared spectrum, while limiting transmission of some or all light outside that spectrum (e.g., the RIB region 124 is substantially opaque to light in the red-green-blue spectrum). In another implementation, the NIB region 122 permits a certain amount of light to pass through (e.g., transparent), while the RIB region 124 permits a measurably different amount of light to pass through (e.g., translucent). In another implementation, the NIB region 122 permits transmission of light having a first polarization orientation (e.g., vertically polarized light), while the RIB region 124 permits transmission of a different polarization orientation (e.g., horizontally polarized light). In some implementations, the NIB region 122 is configured to permit transmission of light primarily within a particular spectrum (a band of frequencies), and the RIB region 124 is configured to permit transmission of light only of a particular frequency or sub-band within the spectrum. For example, the NIB region 122 can be substantially transparent to light over at least the visible spectrum, while the RIB region 124 includes a color filter that is substantially transparent to light components only at a particular frequency (e.g., corresponding to a particularly, perhaps relatively uncommon, shade of green).

The reference elements can be implemented in any suitable manner to have a detectably different and deterministic impact on light components. In some implementations, the substrate of the filter mask 120 is made of a material having desired properties for the NIB region 122 (e.g., a transparent substrate material, such as glass), and the RIB region 124 refers to a particular region of the substrate treated to pass through only light components matching reference characteristics (e.g., a particular color, polarization, etc.). In other implementations, the substrate of the filter mask 120 is made of a material having desired properties for the RIB region 124 (e.g., treated material, such as glass with a polarization coating), and the NIB region 122 refers to a particular region of the substrate treated to pass through normal light components (e.g., the polarization coating is removed in the NIB region 122. In other implementations, the RIB region 124 and/or the NIB region 122 is implemented by treating the substrate, incorporating optical elements into the substrate, or in any other suitable manner.

The NIB region 122 and the RIB region 124 are spatially distinct regions of the filter mask 120. As such, when light passes through the lens assembly 110 and the filter mask 120, light rays pass through the NIB region 122 along a first set of paths, and light rays pass through the RIB region 124 along a second set of paths. The light components passing through the NIB region 122 along the first set of paths are focused onto a first (e.g., normal) focal plane, and the light components passing through the RIB region 124 along the second set of paths are focused onto a second (e.g., reference) focal plane. In one implementation, the lens assembly 110 is configured with particular chromatic aberration to manifest a different focal response between the NIB region 122 and the RIB region 124.

For example, FIGS. 1A and 1B show a scene object 105 located some object distance 107 from the filter mask 120. While the object distance 107 is illustrated as between the scene object 105 and the filter mask 120, the object distance 107 can be calibrated to refer to the distance between the scene object 105 and any suitable component. For example, the object distance 107 can indicate a distance between the scene object 105 and a particular lens component of the lens assembly 110, between the scene object 105 and the image sensor 130, etc. As illustrated, light components that originate from the scene object 105 (e.g., reflecting off of a surface of the scene object 105) and pass through the NIB region 122 are focused by the lens assembly 110 onto a normal focal plane 143, and the light components that originate from the scene object 105 and pass through the RIB region 124 are focused onto a reference focal plane 145.

In the illustrated configuration, the normal focal plane 143 and the reference focal plane 145 are offset from each other by a focal plane offset distance 144.

After being focused through the filter mask 120 by the lens assembly 110, light from the scene object 105 can be detected by the image sensor 130. Embodiments of the image sensor 130 include a large number of photodetector elements (e.g., pixels) arranged in any suitable manner. The photodetector elements can lie in a detection plane 141. In some implementations, the filter mask 120 lays generally in a filter plane (not shown), and the detection plane 141 is substantially parallel to the filter plane. In some implementations, the photodetector elements are arranged in an array. The photodetector elements are responsive both to the light components passing through the NIB region 122 and to the light components passing through the RIB region 124. As illustrated, normal light components being focused onto the normal focal plane 143 (i.e., those originating from the scene object 105 and passing through the NIB region 122) intersect with the detection plane 141 to be detected as corresponding optical information by the photodetectors of the image sensor 130, and reference light components being focused onto the reference focal plane 145 (i.e., those originating from the scene object 105 and passing through the RIB region 124) intersect with the detection plane 141 to be detected as corresponding optical information by the photodetectors of the image sensor 130. For the sake of illustration, a normal image spot 132 is shown as a projection of a feature of the scene object 105 focused through the NIB region 122 onto the image sensor 130, and a reference image spot 134 is shown as a projection of the same feature of the scene object 105 focused through the RIB region 124 onto the image sensor 130.

Embodiments of the lens assembly 110 (e.g., and the filter mask 120) are configured so that there is some object distance 107 at which the normal focal plane 143 is substantially co-planar with the detection plane 141 (i.e., a normal detection offset 142 is substantially zero). For example, with typical imaging, a scene object 105 at such an object distance 107 may be considered "in focus" with respect to the image sensor 130. As the object distance 107 increases or decreases from there, the normal detection offset 142 moves away from zero and the scene object 105 can become "out of focus." A change in the normal detection offset 142 can manifest as a change in overlap between scene object 105 features projected through the NIB region 122 (e.g., the normal image spot 132) and corresponding features projected through the RIB region 124 (e.g., the reference image spot 134). Such correlation between changes in object distance 107 and changes in overlap between the normal features and corresponding reference features can hold true even in embodiments in which the lens assembly 110 (e.g., and the filter mask 120) is configured so that the focal plane offset distance 144 stays substantially constant with changes in object distance 107.

For the sake of illustration, FIG. 1A shows the scene object 105 at a first object distance 107a. At this first object distance 107a, the normal focal plane 143 and the reference focal plane 145 are both located beyond the detection plane 141. The normal focal plane 143 is offset from the reference focal plane 145 by a focal plane offset distance 144, and the normal focal plane 143 is offset from the detection plane 141 by a first normal detection offset 142a. FIG. 1B shows the same scene object 105 at a second object distance 107b. At this second object distance 107b, the detection plane 141 is beyond both the normal focal plane 143 and the reference focal plane 145. The normal focal plane 143 is offset from the reference focal plane 145 by the same focal plane offset distance 144, but the normal focal plane 143 is offset from the detection plane 141 by a second normal detection offset 142b.

Embodiments of the processor 150 can obtain a normal image of the scene object 105 responsive to the normal light components interacting with the photodetector elements of the image sensor 130, and can obtain a reference image of the scene object 105 responsive to the reference light components interacting with the photodetector elements of the image sensor 130. The processor 150 can include a central processing unit CPU, an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. In some implementations, the image sensor 130 is configured to pass raw optical information to the processor 150, and the processor 150 obtains the normal and reference images by obtaining the raw data and generating the normal and reference images from the raw data. For example, each photodetector element outputs a signal level, and the processor 150 converts the signal levels recorded in a single imaging frame into one or more images. In other implementations, the image sensor 130 includes processing capabilities to fully or partially generate the normal and reference images, and the processor 150 obtains the normal and reference images by obtaining the partially or fully generated images from the image sensor 130 (e.g., and completing generation of the images, as appropriate).

In some embodiments, the normal and reference images are generated and/or obtained in a single imaging frame. For example, the image sensor 130 concurrently receives both the normal and reference light components, and the reference light components and/or the normal light components are digitally parsed (or otherwise differentiated) to generate the normal and reference images. In other embodiments, the normal and reference images are generated and/or obtained in two or more imaging frames. For example, normal and reference light components are permitted to be received by the image sensor 130 in a first imaging frame, and mechanical components (e.g., a physical aperture) are used to block reference or normal light components from reaching the image sensor 130 in a second imaging frame. As another example, one or more photodetector elements are adjusted (e.g., sensitivity, filter settings, etc.) to be more sensitive to certain light components (e.g., normal or reference) in a first imaging frame, and to different light components (e.g., reference or normal) in a second imaging frame.

Because the different light components are traveling along different paths, the normal detection offset 142 impacts overlap between normal image features (e.g., the normal image spot 132) and corresponding reference image features (e.g., the reference image spot 134). For example, there is some normal detection offset 142 at which the normal image spot 132 completely (or almost completely) overlaps with the reference image spot 134. However, any change in the normal detection offset 142 manifests as non-overlap between the normal image spot 132 and the reference image spot 134, which can be considered as blurring between the images. The processor 150 can compute a blurring value between the normal image spot 132 (e.g., or an edge or other feature of the normal image spot 132) and the reference image spot 134 (e.g., or an edge or other feature of the reference image spot 134). In some implementations, the blurring value is computed according to a measurement of a blurring distance 146 between the normal image spot 132 and the reference image spot 134. The blurring distance 146 is illustrated in FIGS. 1A and 1B as a distance between an outer edge of the normal image spot 132 and an opposite outer edge of the reference image spot 134. However, the blurring distance 146 can refer to any suitable distance between a detectable feature of the normal image and a corresponding detectable feature of the reference image. Any detectable feature can be used, so long as a corresponding feature is found in both the normal image and the reference image. In some implementations, the blurring distance 146 is a distance between a particular edge detected in the normal image and the same edge detected in the reference image. For example, the processor 150 uses any suitable image processing techniques to detect comparable features from which to compute (e.g., measure) the blurring distance 146. The blurring value can be the blurring distance 146, or the blurring value can be any numeric or non-numeric value (e.g., a blurring score) corresponding to the blurring distance 146.

For the sake of illustration, with the scene object 105 at the first object distance 107a in FIG. 1A, a first blurring distance 146a can be computed. With the scene object 105 at the second object distance 107b in FIG. 1B, a second blurring distance 146b can be computed. In some implementations, the blurring distance 146 is simply an absolute distance measurement. The configuration shown in FIGS. 1A and 1B illustrates, however, that some implementations rely on additional information as part of the blurring distance 146 (or blurring value). As shown, the normal image spot 132 is to the left of the reference image spot 134 in FIG. 1A (where the detection plane 141 is in front of both the normal focal plane 143 and the reference focal plane 145), but the normal image spot 132 is to the right of the reference image spot 134 in FIG. 1B (where the detection plane 141 is behind both the normal focal plane 143 and the reference focal plane 145). Thus, if an absolute measurement is used for blurring distance 146 in such a configuration, there may be at least two object distances 107 manifesting a same blurring distance 146. This can be addressed in multiple ways. Some implementations compute the blurring distance 146 to indicate a blurring direction, such as by including a sign. For example, a distance is computed always from a feature of the reference image to a corresponding feature of the normal image, such that a positive result indicates blurring in one direction, and a negative result indicates blurring in the other direction. Other implementations determine blurring direction (e.g., using image processing techniques) and separately compute blurring distance 146, and the blurring value indicates both. Other implementations use the blurring distance 146 to determine a pair of candidates (e.g., a closer candidate object distance 107 associated with the measured blurring distance 146 and a farther candidate object distance 107 associated with the same blurring distance 146) and use an additional sensor to select one of the candidates (e.g., by using time-of-fly or other techniques to determine a rough distance).

Figure 2:
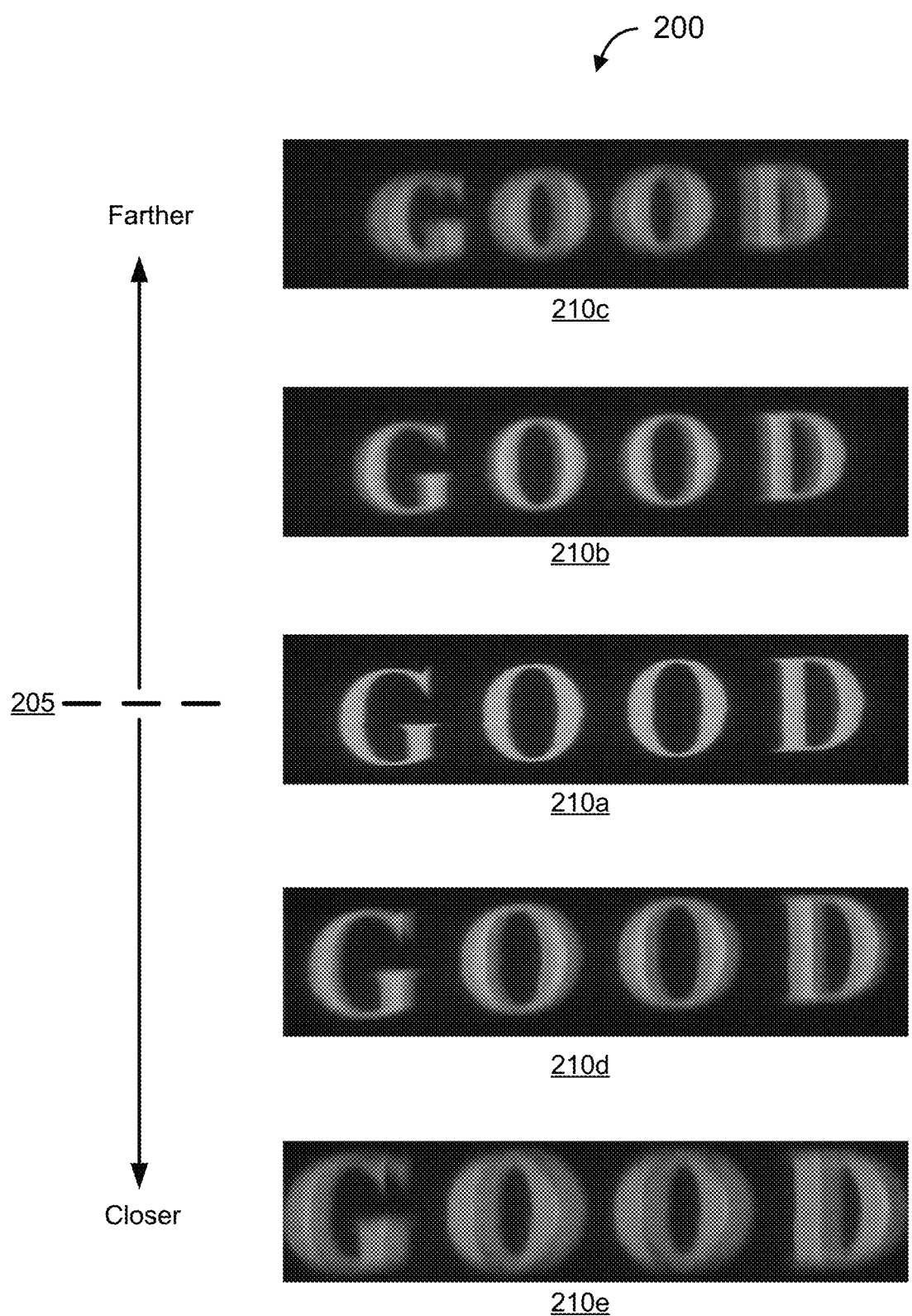
FIG. 2 shows example image outputs according to various embodiments described herein.

For the sake of illustration, FIG. 2 shows example image outputs 200 according to various embodiments described herein. In the illustrated scenario, the word "GOOD" is on the surface of a scene object 105 illuminated with white light, and the scene object is imaged using a passive three-dimensional imaging system, such as described herein. For clarity, the RIB region 124 of the filter mask 120 is configured as a bandpass for red light, and the NIB region 122 of the filter mask 120 is configured as a bandpass for blue light. As described herein, normal light components pass through the NIB region 122 of the filter mask 120 and are focused according to a normal focal plane 143, thereby intersecting with the detection plane 141 so as to produce a blue-colored normal image. Reference light components pass through the RIB region 124 of the filter mask 120 and are focused according to a reference focal plane 145, thereby intersecting with the detection plane 141 so as to produce a red-colored reference image.

As shown, there is a particular object distance 107 (indicated as calibration object distance 205) at which a respective composite image 210a show the blue-colored normal image almost completely overlapping with and the red-colored reference image. As the object distance 107 increases, the amount of blurring increases (the amount of overlap decreases), as illustrated by comparing composite image 210a with composite image 210b, and further with composite image 210c. These images also show the blurring resulting in features of the blue-colored normal image moving in a rightward direction relative to the corresponding features of the red-colored reference image as the object distance 107 increases. As the object distance 107 decreases, the amount of blurring again increases, as illustrated by comparing composite image 210a with composite image 210d, and further with composite image 210e. In contrast to composite image 210b and composite image 210c, composite image 210d and composite image 210e show the blurring resulting in features of the blue-colored normal image moving in a leftward direction relative to the corresponding features of the red-colored reference image as the object distance 107 decreases.

Returning to FIGS. 1A and 1B, as the normal detection offset 142 changes deterministically according to the object distance 107, this change in normal detection offset 142 manifests as a deterministic correlation between blurring distance 146 and object distance 107. For example, a calibration object distance can be determined at which there is a near-zero normal detection offset 142. As the object distance 107 moves away from the calibration object distance, the normal detection offset 142 increases, manifesting as an increase in blurring distance 146. Thus, the processor 150 can determine the object distance 107 as a function of the blurring value. In some embodiments, the processor 150 determines object distance 107 according to a pre-programmed mathematical correlation. For example, the processor 150 is programmed with a formula that outputs object distance 107 as a function of blurring distance 146 (or blurring value). In some embodiments, the processor 150 determines object distance 107 according to a lookup table, or the like, stored in a memory 155 accessible to the processor 150 (e.g., any suitable on-board or off-board, non-transient, processor-readable memory). As used herein, a lookup table generally refers to any associative data structure in which each of a first set of values can be associated with a respective one of a second set of values. For example, prior calibration is used to store a set of measured (or pre-determined) object distances 107 each in association with a resulting measured blurring distance 146, and those associations are store in the memory 155. Subsequently, the processor 150 can determine a present object distance 107 by measuring a present blurring distance 146, consulting the memory 155 to identifying a closest matching blurring distance 146 value in the lookup table, and using the associated stored object distance 107 in the lookup table as the present object distance 107.

As described herein, the lookup table can be generated as part of a calibration procedure. For example, during the calibration procedure, one or more calibration targets can be placed at multiple calibration distances. For each calibration distance (e.g., and/or other condition, such as target type, ambient lighting, probe lighting, etc.), a respective association be recorded between the calibration conditions and resulting blurring values. Each of some or all of the resulting blurring values can be stored as a calibration mapping by associating the computed blurring value with a known value for the calibration configuration (e.g., calibration object distance), and storing the association in the lookup table. In some embodiments, some or all of the calibration can be used to fit one or more formulaic expressions to the data. For example, the stored associations can tend to fit polynomials of a particular order, and/or can be used to compute coefficients for one or more polynomials. The calibration formula or formulas can subsequently be used for determining object distances as a function of blurring value.

In some embodiments, the lens assembly 110 and/or the image sensor 130 are configured to be focused. Such embodiments can integrate features to manually and/or automatically focus by physically adjusting a distance between the lens assembly 110 and the image sensor 130, and/or by reconfiguring (e.g., changing distances, angles, etc.) components of the lens assembly 110. By manually focusing and/or activating auto-focus, components can effectively set the object distance 107 at which a scene object 105 (or a particular feature of a scene object 105) is "in focus" with respect to the image sensor 130. With that particularly focused setup, there is a particular in-focus object distance 107 at which the normal focal plane 143 is substantially co-planar with the detection plane 141. Associations between changes in blurring distance 146 and changes in the object distance 107 are relative to that particular in-focus object distance 107. If the setup is refocused to a new in-focus object distance 107, there may also be a change in relative associations between changes in blurring distance 146 and changes in the object distance 107. In embodiments that support manual and/or automatic focusing, the processor 150 can be further configured to detect the present focus setup and compute the object distance 107 as a function of both the blurring distance 146 and the focus setup. In some such embodiments, the memory 155 has stored thereon multiple sets of associations between object distances 107 and blurring distances 146, each corresponding to a respective one of multiple pre-calibrated focus setups. The multiple sets of associations can be stored in a single lookup table, multiple lookup tables, or in any suitable data structure. In other such embodiments, a respective mathematical correlation is computed for each of multiple focus setups as part of a calibration. For example, a calibration routine can be used to derive respective values for one or more constants at each of multiple focus setups.

Figure 3A:
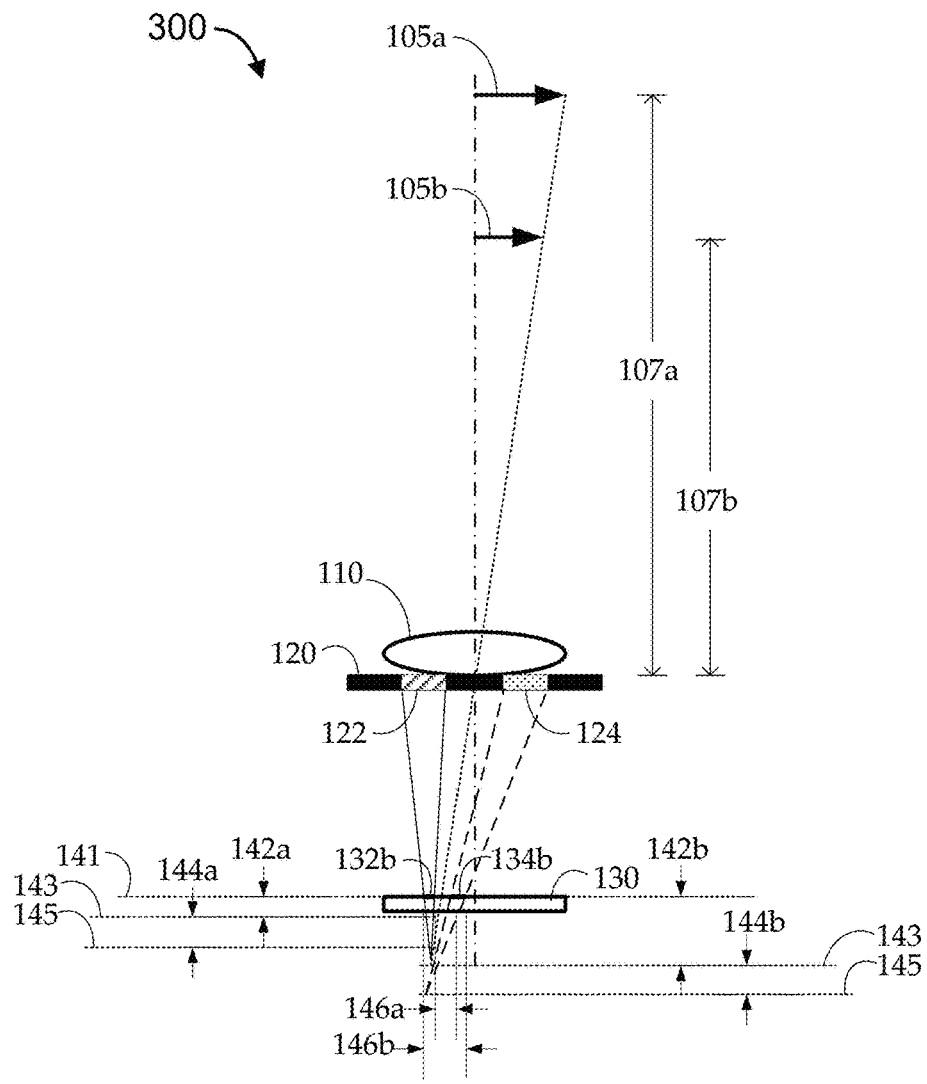
FIG. 3A shows another illustrative passive 3D image sensing environment, to further illustrate features of various embodiments.

FIG. 3A shows another illustrative passive 3D image sensing environment 300, to further illustrate features of various embodiments. As in FIGS. 1A and 1B, the environment 300 includes a lens assembly 110, an image sensor 130, and a filter mask 120. The processor 150 and memory 155 are not shown. As illustrated, a first scene object 105a is shown at a first object distance 107a, and a second scene object 105b is shown at a second object distance 107b. For both scene objects 105 at both object distances 107, the normal focal plane 143 and the reference focal plane 145 are both beyond the detection plane 141, and the focal plane offset distance 144 is substantially the same. However, at the farther object distance 107a, the normal detection offset 142a is smaller; and at the closer object distance 107b, the normal detection offset 142b is relatively larger.

Figure 3B:
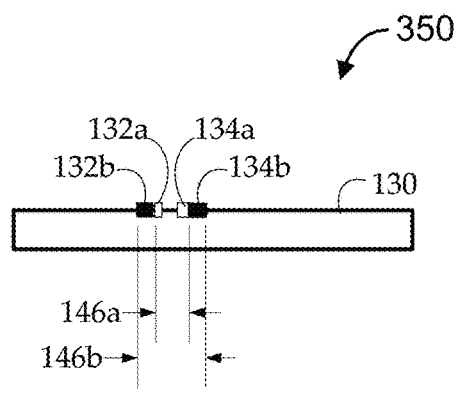
FIG. 3B shows an enlarged view of the image sensor of FIG. 3A.

As illustrated in FIG. 3A, the change in normal detection offset 142 also manifests as a change in blurring distance 146. For added clarity, FIG. 3B shows an enlarged view 350 of the image sensor 130 of FIG. 3A. At the farther object distance 107a, the normal light components intersect with the detection plane 141 as a first normal image spot 132a, and the reference light components intersect with the detection plane 141 as a first reference image spot 134a; and the first normal image spot 132a and the first reference image spot 134a are separated by a first blurring value 146a. At the closer object distance 107b, the normal light components intersect with the detection plane 141 as a second normal image spot 132b, and the reference light components intersect with the detection plane 141 as a second reference image spot 134b; and the second normal image spot 132b and the second reference image spot 134b are separated by a second blurring value 146b. The difference between the first and second blurring distances 146 corresponds (e.g., linearly, non-linearly, or in any other deterministic manner) to a difference between the first and second object distances 107.

Figure 4:
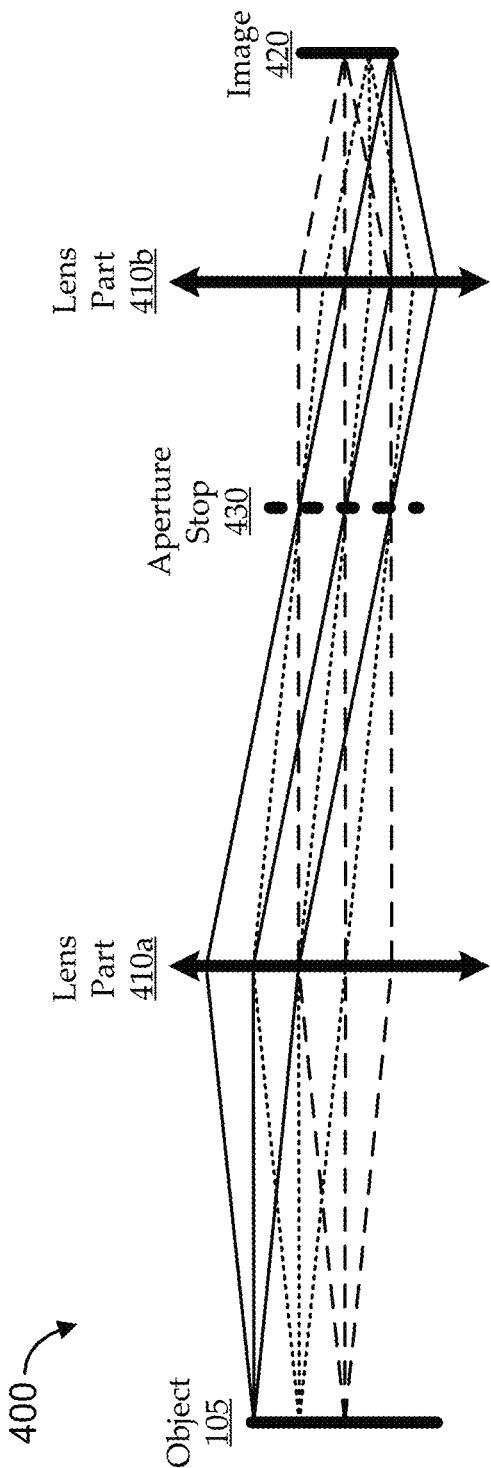
FIG. 4 shows an illustrative configuration of a lens assembly that can be incorporated into some embodiments described herein.
Figure 5:
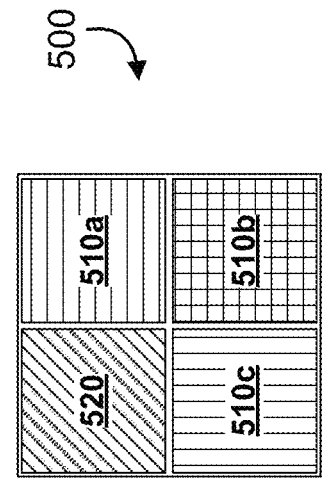
FIG. 5 shows an illustrative configuration of a pixel of an image sensor for use with embodiments described herein.
Figure 6:
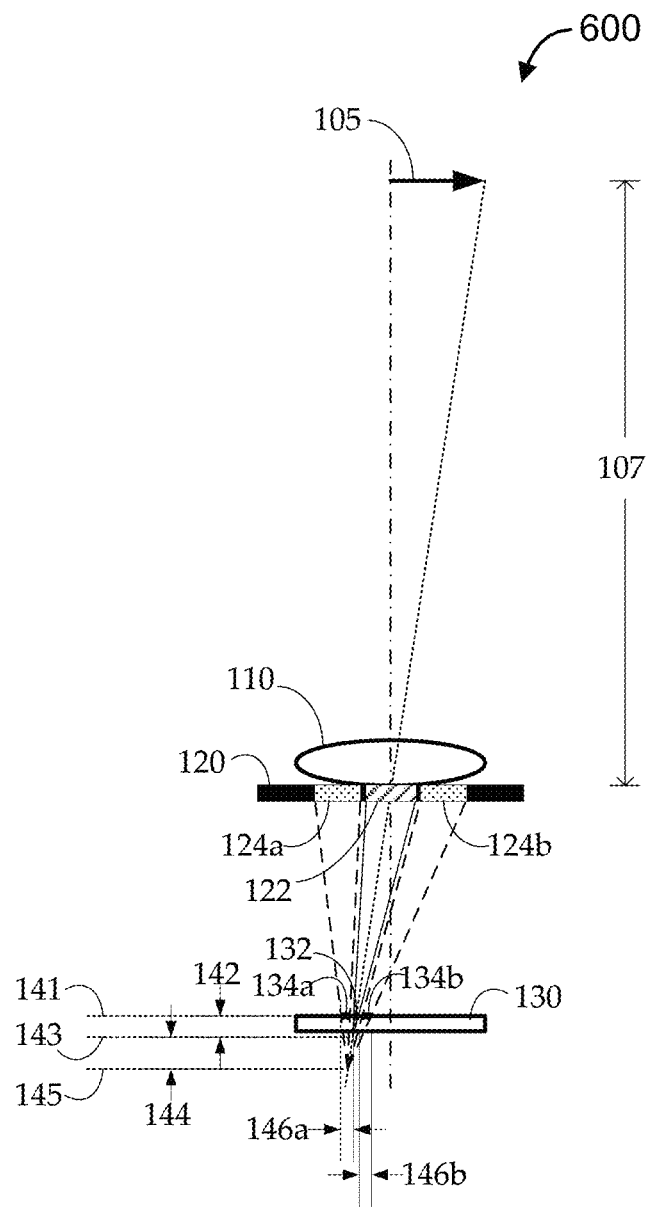
FIG. 6 shows another illustrative passive 3D image sensing environment having a particular configuration of a filter mask, to further illustrate features of various embodiments.

Certain design considerations can impact features of embodiments described herein. For example, FIG. 4 illustrates a manner of configuring the lens assembly 110 to support particular integration of the filter mask 120. FIG. 5 illustrates an example configuration of a pixel of the image sensor 130. FIGS. 6-7C illustrate a particular category of example configurations for the filter mask 120 and optional integration of a mechanical aperture.

FIG. 4 shows an illustrative configuration of a lens assembly 400 that can be incorporated into some embodiments described herein. The lens assembly 400 can be an implementation of the lens assembly 110 described with reference to other embodiments herein. The lens assembly 400 can be made up of various lens parts 410, such as discrete convex and/or concave lenses, mirrors, and/or other optics. For the sake of simplicity, the lens assembly 410 is illustrated as implemented by a first lens part 410a and a second lens part 410b, both illustrated effectively as concave lenses. Light rays originating at a scene object 105 (e.g., reflecting from the scene object 105) travel along a path that is focused by both the first lens part 410a and the second lens part 410b to form an object image 420 (e.g., on an image plane). Light from different scene object features 105 and different light components travel along different optical paths through the first lens part 410a and the second lens part 410b. However, as shown, there can be a location along the multiple optical paths, where the paths tend to intersect. Such a location can be referred to as an aperture stop 430 (e.g., a common aperture location). In some embodiments, the filter mask 120 is located at, or near, the aperture stop 430. For example, the filter mask 120 is designed so that the NIB region 122 and the RIB region 124 lie in a filter plane that is substantially parallel to, and substantially co-planar with, a plane of the aperture stop 430. Such a configuration can help ensure that reference image components can cover all normal image components, thereby helping permit such a configuration to obtain distance information for all image elements.

FIG. 5 shows an illustrative configuration of a pixel 500 of an image sensor for use with embodiments described herein. The pixel 500 can be an implementation of a set of photodetector elements, of the image sensor 130 described with reference to embodiments herein. The illustrative pixel 500 includes four photodetector elements (e.g., photodiodes), three being normal photodetector elements 510 to detect three normal light components, and one being a reference photodetector element 520 to detect a reference light component. For example, the normal photodetector elements 510 are configured to detect light components in the visible spectrum, and the reference photodetector element 520 is configured to detect light components outside the visible spectrum (e.g., in the near infrared spectrum, such as light components in the 850 nm or 940 nm wavelength bands). In one implementation, the photodetector elements are arranged according to a modified Bayer pixel pattern. A conventional Bayer pixel pattern includes one red photodetector (i.e., one photodetector configured to detect a light component in the red band of the color spectrum), one blue photodetector, and two green photodetectors. In the modified Bayer pixel pattern implementation, one of the green photodetectors can be replaced by a reference photodetector. For example, normal photodetector elements 510a, 510b, and 510c are configured to detect red, green, and blue light components, respectively; and reference photodetector element 520 is configured to detect a reference light components.

Though the illustrated pixel 500 includes four photodetector elements, each pixel 500 can include any suitable number of photodetector elements of any suitable type. Further, different pixels 500 may have different numbers and/or types of photodetector elements. As described herein, one or more normal photodetector elements 510 and one or more reference photodetector elements 520 can be configured detecting for any suitable difference in light components. In some embodiments, the photodetector elements do not differentiate between normal and reference light components; rather, such differentiation occurs in pre- or post-processing. In some such embodiments, the photodetector elements can all be configured to detect light components in the visible spectrum, but post-processing is used to discriminate detected optical information as being within one or more normal component bands, or reference component bands. In other such embodiments, normal and reference components are separately acquired (e.g., using active probe illumination in different imaging frames), such that the optical information is received pre-determined as normal and reference components.

FIG. 6 shows another illustrative passive 3D image sensing environment 600 having a different configuration of filter mask 120, to further illustrate features of various embodiments. As in the embodiments illustrated above, the environment 300 includes a lens assembly 110, an image sensor 130, and a filter mask 120. The processor 150 and memory 155 are not shown. Unlike the embodiments illustrated above, the filter mask 120 is illustrated with multiple RIB regions 124 on either side of the NIB region 122. The multiple RIB regions 124 can have the same optical characteristics (e.g., passing through the same reference components), or they can have different optical characteristics (e.g., to pass through different types of reference components, for example, to support generation of multiple reference images). Further, the multiple RIB regions 124 may have the same focal length, or different focal lengths. For example, as illustrated, the both RIB regions 124 focus to the same reference focal plane 145. In some embodiments, the multiple RIB regions 124 are actually part of the same RIB region 124. For example, as described below with reference to FIGS. 7A-7C, the RIB region 124 can be implemented concentrically around the NIB region 122, appearing as multiple RIB regions 124 in the cross-sectional view of FIG. 6.

A scene object 105a is shown at an object distance 107 away from the filter mask 120. Light components from the scene object 105 is focused by the lens assembly 110 through the filter mask 120, and the light components are detected by the image sensor 130 substantially where they intersect with the detection plane 141. As illustrated, a particular object feature can effectively be projected through multiple optical paths to form a normal image spot 132 corresponding to the light components passing through the NIB region 122, and two reference image spots 134 corresponding to the light components passing through the two RIB regions 124. As such, there can effectively be two or more blurring effects corresponding to the two of more RIB regions 124. In such a case, one or more of the different blurring effects can be used to compute a blurring value. For example, as illustrated, non-overlap between the normal image spot 132 and a first reference image spot 134a can yield a first blurring distance 146a, and non-overlap between the normal image spot 132 and a second reference image spot 134b can yield a second blurring distance 146b.

Figure 7A:
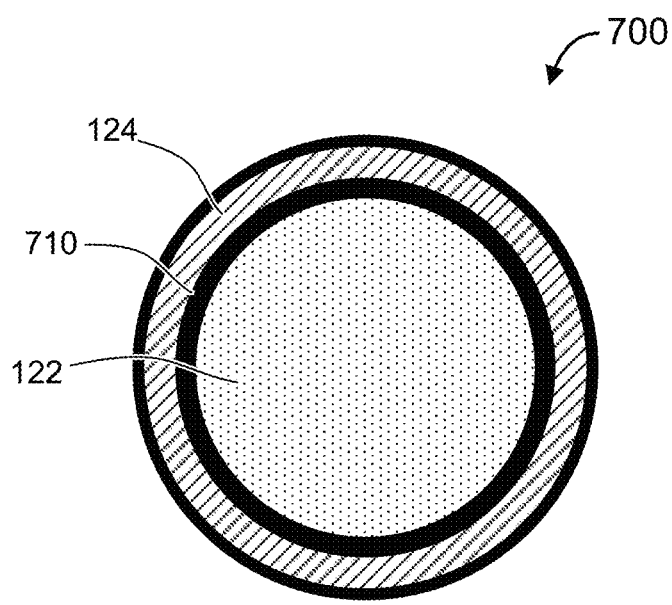
FIG. 7A shows an illustrative implementation of a filter mask, according to various embodiments.

FIG. 7A shows an illustrative implementation of a filter mask 700, according to various embodiments. The filter mask 700 can be an implementation of the filter mask 120 described with reference to other embodiments herein. In the illustrative implementation, the filter mask 700 includes a NIB region 122 and a RIB region 124. The NIB region 122 is implemented as a first circular region, and the RIB region 124 is implemented as a second circular region formed concentrically around the first circular region. Some implementations also include an isolation region 710 implemented as a region that separates, and is optically distinguishable from, the NIB region 122 and the RIB region 124. For example, the isolation region can be an opaque ring formed around the circumference of the NIB region 122, as shown. The locations, shapes, relative sizes, and other characteristics of the filter mask 700 regions can be modified to optimize certain features.

Figure 7B:
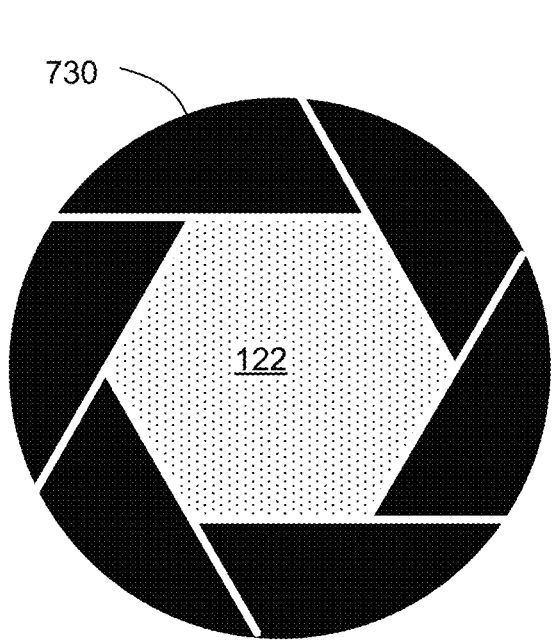
FIGS. 7B and 7C show an illustrative integration of a mechanical aperture with the filter mask of FIG. 7A in normal and reference configurations, respectively.
Figure 7C:
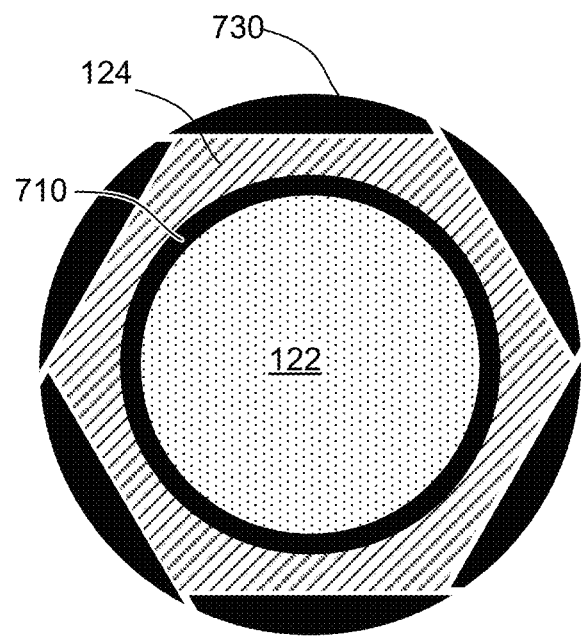

One feature provided by the illustrative filter mask 700 implementation of FIG. 7A is that such an implementation supports physical blocking of the RIB region 124 by a standard type of mechanical aperture. FIGS. 7B and 7C show an illustrative integration of a mechanical aperture 730 with the filter mask 700 of FIG. 7A in normal and reference configurations, respectively. The mechanical aperture 730 is illustrated as a set of opaque geometric components that form an opening of a particular aperture size, and can be opened or closed effectively to change the aperture size. As shown in FIG. 7B, when the mechanical aperture 730 is in the normal configuration, the aperture size is configured to be similar to the diameter of the NIB region 122, thereby exposing the NIB region 122 and blocking the RIB region 124. As such, substantially all of the NIB region 122 can be used to pass through normal light components while physically blocking transmission of light components through the RIB region 124. As shown in FIG. 7C, when the mechanical aperture 730 is in the reference configuration, the aperture size is configured to be similar to the diameter of the RIB region 124 (e.g., fully open), thereby exposing both the NIB region 122 and the RIB region 124. As such, substantially all of the NIB region 122 and the RIB region 124 can be used to pass through normal light components and reference light components.

The particular illustrated arrangement forms a hexagonal opening, but other configurations can be implemented to form openings of different shapes and/or in different ways. For example, using more opaque geometric components, or shaping the components differently (e.g., by curving the edges) can yield an opening more closely approximating a circular aperture opening. Using a smaller number of simpler opaque geometric components can be less expensive, lighter, and/or otherwise desirable in certain ways. However, without a circular aperture opening, it can be difficult to expose the entire NIB region 122 without also exposing part of the RIB region 124. In some implementations, exposing a small portion of the RIB region 124 is considered tolerable. In other embodiments, the isolation region 710 is configured to provide enough isolation, so that all (or substantially all) of the NIB region 122 can be exposed in a non-circular aperture opening without also exposing the RIB region 124. In other embodiments, other techniques can be used to provide similar features. For example, other embodiments can include filter masks with different numbers and/or shapes of NIB regions 122 and RIB regions 124, mechanical apertures of different shapes and/or types, etc. In some other embodiments, a transparent liquid crystal display (LCD), or the like, can be used to implement an aperture of any desired shape or size (e.g., by selectively activating and deactivating patterns of LCD pixels to form opaque and transparent regions).

Figure 8A:
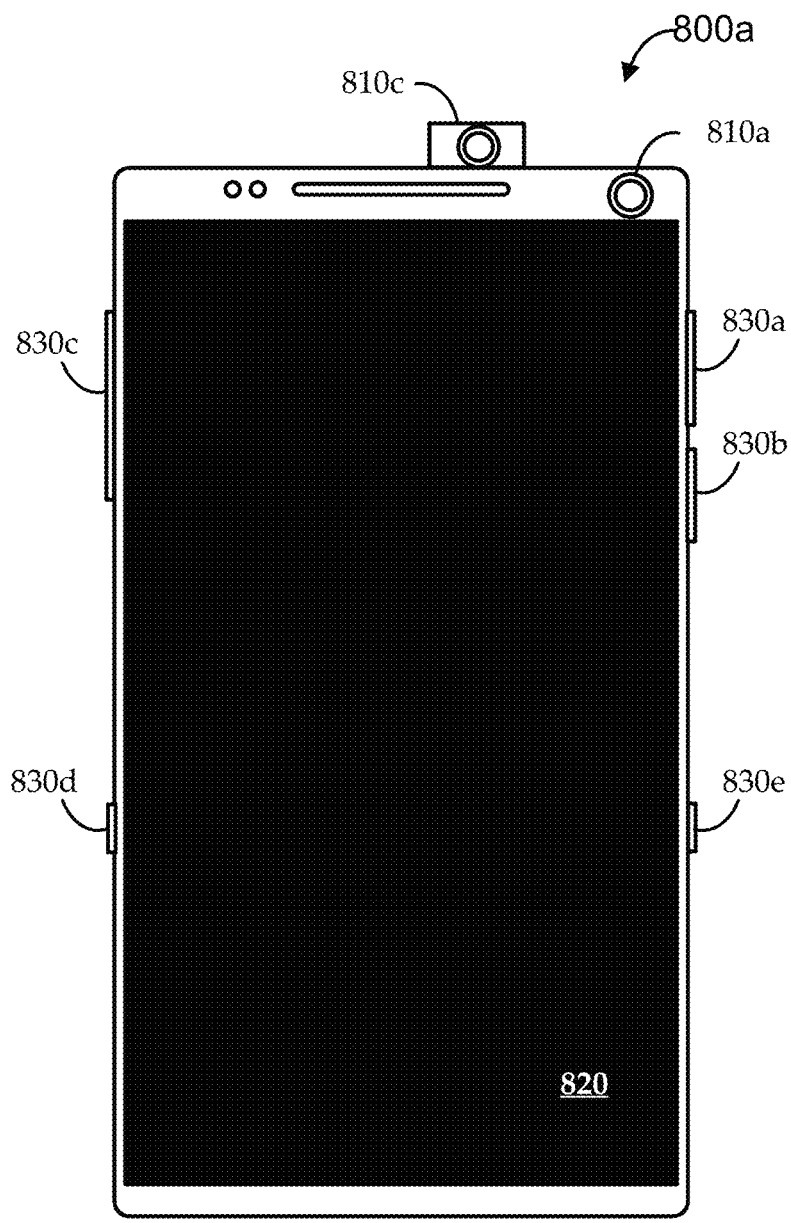
FIGS. 8A and 8B show front and side views, respectively, of an illustrative portable personal electronic device, according to various embodiments.
Figure 8B:
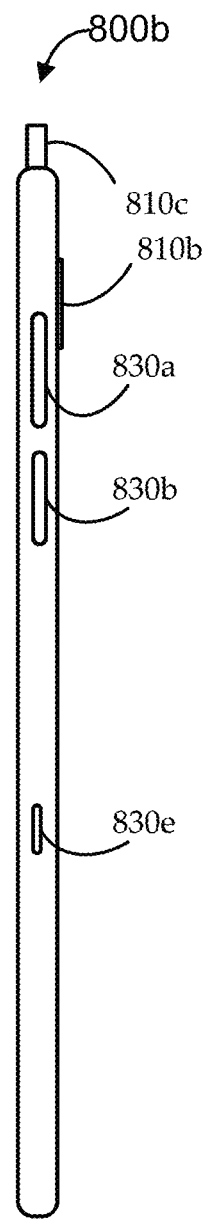

FIGS. 8A and 8B show front and side views, respectively, of an illustrative portable personal electronic device (PPED) 800, according to various embodiments. As used herein, a PPED can include a smartphone, tablet computer, laptop computer, smart wearable device (e.g., a smartwatch), or any other suitable device that has one or more integrated digital imaging systems 810. Embodiments of the PPED 800 can also include one or more displays 820. Though not explicitly shown, some embodiments of the display 820 can have, integrated therewith, capacitive touchscreen elements, another digital imaging system 810, a fingerprint sensor, and/or other components. User interface components can also include one or more physical buttons 830. For example, the physical buttons 830 can include a power button, volume buttons, etc. In some implementations, one or more of the buttons is dedicated to a particular function, and one or more of the buttons is dynamically assignable (e.g., by an application processor and/or other components) to various functions. Though not shown, the PPED 800 can include additional user interface components, such as optical sensors, force sensors, biometric sensors, accelerometers, etc.

One or more (e.g., all) of the digital imaging systems 810 can include a passive 3D optical sensing system. The passive 3D optical sensing system(s) are configured to support capturing of depth information to support three-dimensional features of camera(s) and/or other components. For example, as illustrated, the PPED 800 can include a front-facing (e.g., selfie) digital imaging system 810a, a rear-facing digital imaging system 810b (shown in FIG. 8B), a pop-out digital imaging system 810c, and/or any other suitable integrated digital imaging systems 810. For example, a user desires to capture an image using one of the digital imaging systems 810. The PPED 800 initializes various hardware and software elements to enter an image acquisition mode. As part of the mode, a passive 3D optical sensing system is used to passively collect optical information from the scene in the field of view of the camera, and to determine one or more object distances, and/or generate a depth map of some or all of the scene. As described herein, the optical information is passively received via various optics and sensors, including a lens assembly 110, a filter mask 120 (e.g., as part of, or separate from the lens assembly 110), and an image sensor 130, and can be processed by a processor 150 coupled with memory 155. In some embodiments, the one or more passive 3D optical sensing systems include, or take advantage of, one or more illumination sources, such as probe lighting sources. For example, the probe lighting sources can provide or supplement illumination having normal and/or reference light components. In some embodiments, the processor 150 and/or the memory 155 are dedicated components of the passive 3D optical sensing system. In other embodiments, the processor 150 is implemented by a processor of the PPED (e.g., a central processor, graphics processor, or other processor of the PPED, not specific to the passive 3D optical sensing system). In other embodiments, the memory 155 is implemented by memory of the PPED, such as removable or non-removable storage of the PPED not specific to the passive 3D optical sensing system.

Figure 9A:
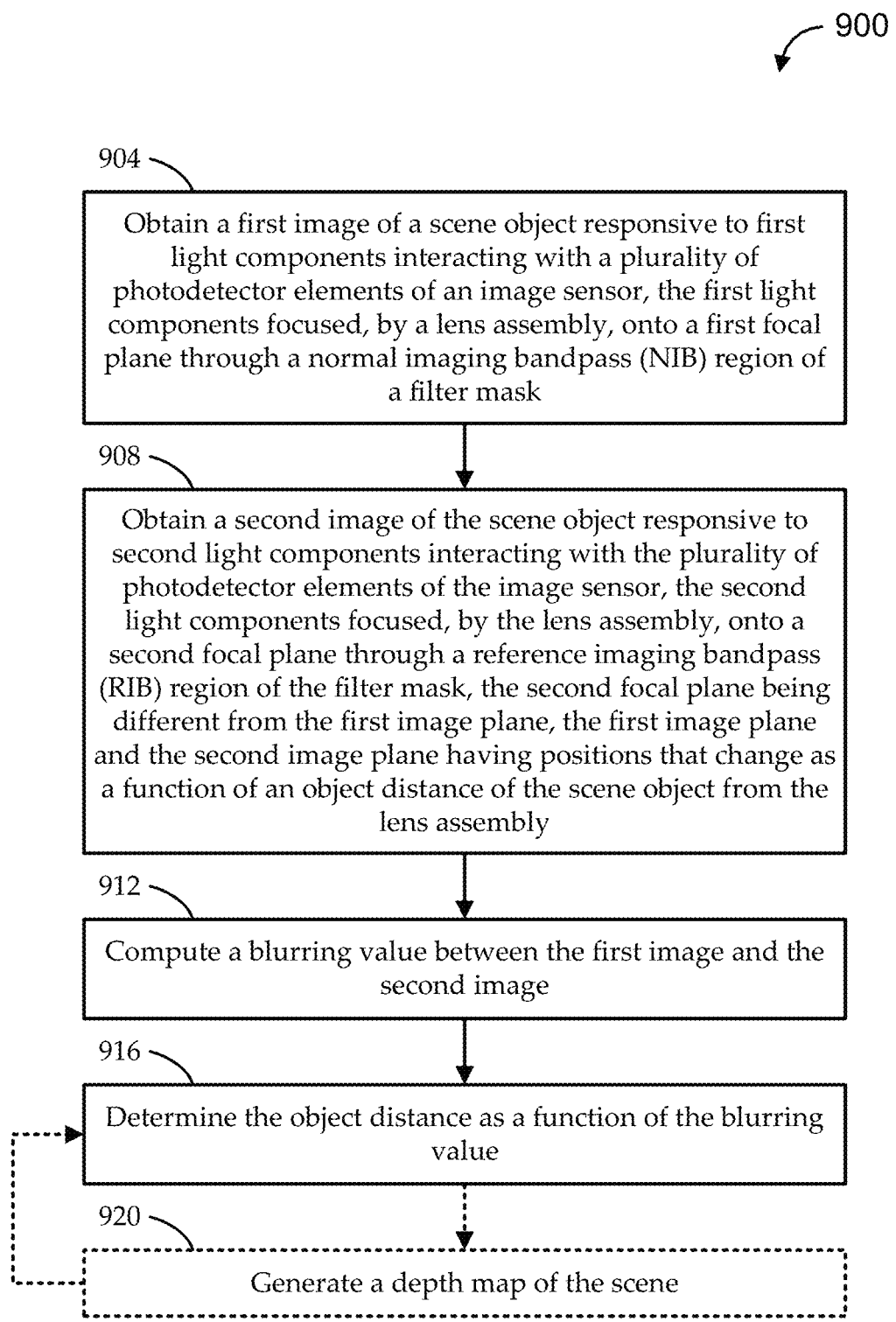
FIG. 9A shows a flow diagram of an illustrative method for passive three-dimensional imaging, according to various embodiments.

The various systems above can be used to perform various methods, such as those described below. FIG. 9A shows a flow diagram of an illustrative method 900 for passive three-dimensional imaging, according to various embodiments. Embodiments of the method 900 begin at stage 904 by obtaining a first image of a scene object responsive to first light components interacting with photodetector elements of an image sensor. The first light components are focused, by a lens assembly, onto a first focal plane through a normal imaging bandpass (NIB) region of a filter mask. At stage 908, embodiments obtain a second image of the scene object responsive to second light components interacting with the plurality of photodetector elements of the image sensor. The second light components are focused, by the lens assembly, onto a second focal plane through a reference imaging bandpass (RIB) region of the filter mask. The second focal plane can be different from the first image plane, for example, due to chromatic aberration in the lens assembly. The first image plane and the second image plane have positions that change as a function of an object distance of the scene object from the lens assembly (the object distance being measurable between the scene object and any suitable component of the lens assembly, filter mask, image sensor, etc.).

At stage 912, embodiments compute a blurring value between the first image and the second image. The blurring value can indicate a measurement of non-overlap (i.e., blurring) distance between the first and second images. In some embodiments, the images are generated by the image sensor and passed to a processor, which performs the computing at stage 912. In other embodiments, the processor generates the images. In some embodiments, obtaining the first image at stage 904 includes capturing first optical information at a first time responsive to the first light components interacting with the photodetector elements, and generating the first image (e.g., by the image sensor and/or by the processor) according to the first optical information; and obtaining the second image at stage 908 includes capturing second optical information at a second time responsive to the second light components interacting with the plurality of photodetector elements, the second time being different from the first time, and generating the second image (e.g., by the image sensor and/or by the processor) according to the second optical information. In other embodiments, obtaining the first image at stage 904 includes digitally parsing first optical information corresponding to the first light components interacting with the photodetector elements at a first time, and generating the first image according to the first optical information; and obtaining the second image at stage 908 includes digitally parsing second optical information corresponding to the second light components interacting with the photodetector elements at the first time, and generating the second image according to the second optical information.

At stage 916, embodiments determine the object distance as a function of the blurring value. In some embodiments, the determining at stage 916 involves computing the object distance according to a predetermined formula. For example, the formula describes a polynomial, or other mathematical correspondence, having coefficients or other parameters determined in accordance with the manner in which the lens assembly and image sensor are presently focused. In other embodiments, the determining at stage 916 involves selecting a best (e.g., closest) value of object distance according to a previously calibrated and stored lookup table that associates blurring values with object distances.

Some embodiments of the method 900 continue at stage 920 by generating a depth map of some or all of the scene in view of the passive imaging system. The generating at stage 920 can be performed by identifying multiple depth features in the scene and determining a respective object distance (e.g., by iterating stage 916) for each of the depth features. For example, a scene includes multiple scene objects (e.g., as separate objects, separate edges or other features of the same object, etc.), each at a respective object depth. The depth map can use (e.g., interpolate and/or extrapolate) the respective locations and depths recorded for those scene objects to generate a three-dimensional map of the scene.

In some embodiments, illumination conditions can be configured to improve detection accuracy. For example, certain ambient conditions may be excessively dark, have an excessive amount of reference light components, or otherwise provide undesirable conditions for effective passive three-dimensional depth mapping of a scene. As another example, at expanded positions of a scene object, defined features of the object may not be available, or may be undetectable for use in determining blurring values.

Figure 9B:
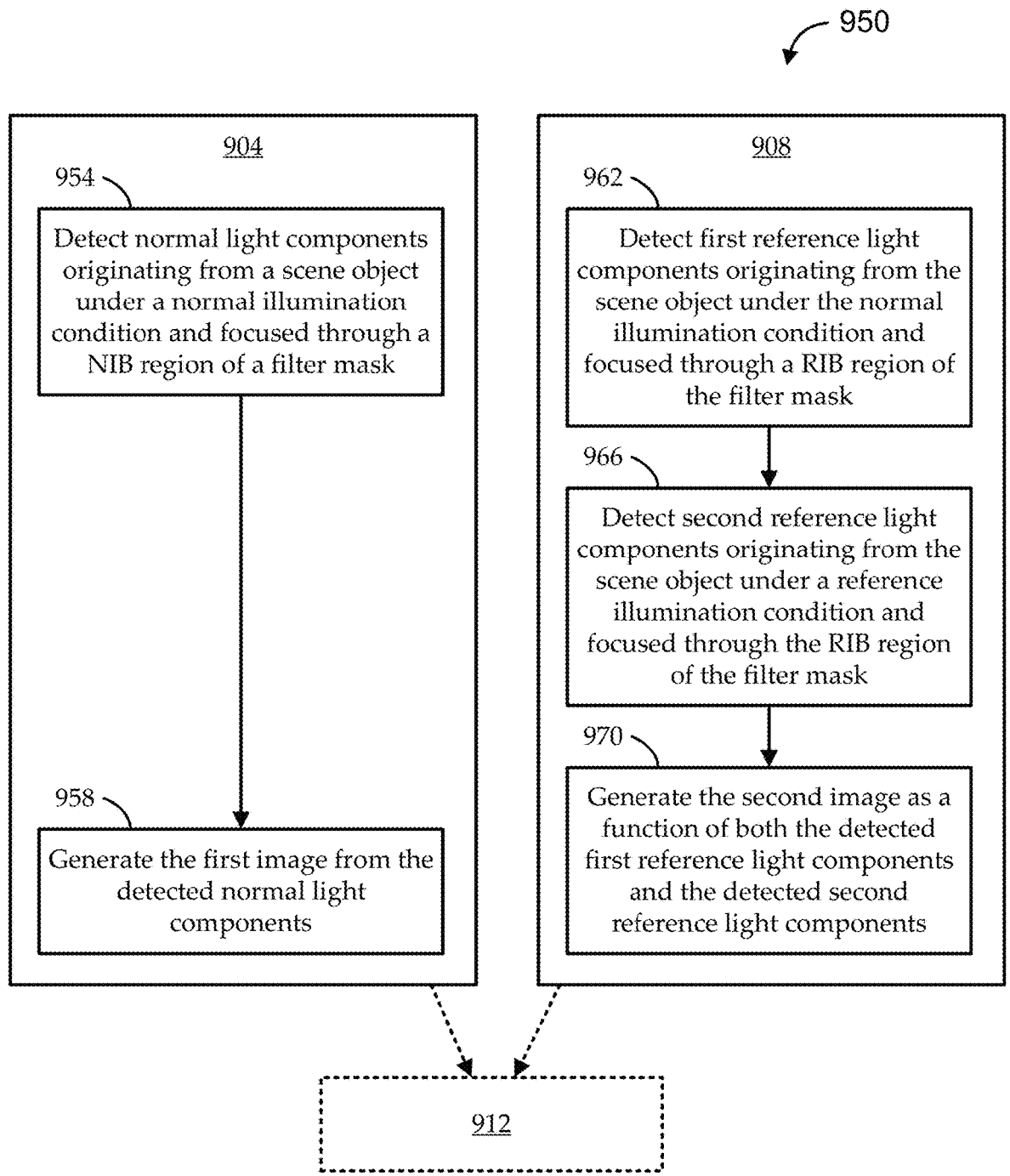
FIG. 9B shows a flow diagram an illustrative implementation of a portion of the method of FIG. 9A that uses multiple illumination conditions for enhanced three-dimensional detection.

FIG. 9B shows a flow diagram an illustrative implementation of a portion 950 of the method 900 of FIG. 9A that uses multiple illumination conditions for enhanced three-dimensional detection. In particular, the portion 950 includes stages 904 and 908 of the method 900, and shows those stages flowing into stage 912 of the method 900 for context. As shown, obtaining the first image at stage 904 can involve multiple stages. At stage 954, embodiments can detect normal light components originating from a scene object under a normal illumination condition and focused through a NIB region of a filter mask. At stage 958, embodiments can generate the first image from the detected normal light components. Obtaining the second image at stage 908 can also involve multiple stages. At stage 962, embodiments can detect first reference light components originating from the scene object under a normal illumination condition and focused through a RIB region of a filter mask. At stage 966, embodiments can detect second reference light components originating from the scene object under a reference illumination condition and focused through the RIB region of the filter mask. At stage 970, embodiments can generate the second image as a function of both the detected first reference light components and the detected second reference light components.

For example, during a first imaging frame, the scene can be illuminated with ambient lighting conditions (the normal illumination condition). The ambient lighting conditions can include daylight, artificial lighting, and/or any other suitable lighting that includes at least normal light components and may also include reference light components. Under these normal illumination conditions, normal and reference light components are detected by an image sensor at stages 954 and 962, respectively. In some implementations, in addition to generating the first image (i.e., a normal image) at stage 958, a first reference pre-image is also generated from the reference light components detected under the normal illumination conditions. In some implementations, stages 954 and 962 are performed concurrently (e.g., by receiving both normal and reference components together). For example, both normal and reference light components are detected, and the components are discriminated (e.g., parsed, digitally filtered, etc.) to generate the first image at stage 958 and/or to generate the first reference pre-image. In other implementations, stages 954 and 962 are performed serially (e.g., by using a mechanical aperture, or the like, to selectively permit or block the normal and/or reference components in imaging sub-frames). In such implementations, detected normal light components can be used to generate the first image at stage 958, and the detected reference light components can be used either directly (e.g., at stage 970) or to generate the first reference pre-image.

During a second imaging frame, the scene (or a portion of the scene) is illuminated with reference illumination conditions. For example, additional probe lighting is transmitted into the scene to augment (e.g., flood) the scene with the reference light component. Alternatively, the normal illumination condition can include additional lighting having both reference and normal light components, and the reference illumination condition can be produced by removing the portion of the normal illumination having the normal lighting components. In some implementations, the reference illumination condition includes projecting one or more reference spots into the scene to provide features that can be used for determining blurring, for example, where imaged portions of the scene object lack other suitable features. In some implementations, only reference light components are detected in the second frame (e.g., using a mechanical aperture, or other technique). In other implementations, both reference and normal light components are detected in the second imaging frame, and the reference light components are discriminated (e.g., parsed, digitally filtered, etc.) to produce the second reference light components.

Generating the second image at stage 970 can be performed in various ways. In some embodiments, the second image is generated by directly comparing the values of the first reference light components with values of the second reference light components. In other embodiments, reference pre-images can be generated and compared. As described above, embodiments can use the first reference light components detected in the first imaging frame to generate a first reference pre-image. Similarly, embodiments can use the second reference light components detected in the second imaging frame to generate a second reference pre-image. The first reference pre-image can be subtracted from the second reference pre-image to reduce the influence of normal-condition (e.g., ambient) reference light components from the second image. Such an approach can tend to improve the detection of reference features, thereby helping facilitate the type of blurring detection described herein. The first image generated at stage 958 and the second image generated at stage 970 can then be used for computing blurring values at stage 912, determining object distances at stage 916, and/or generating depth maps at stage 920.

Figure 10:
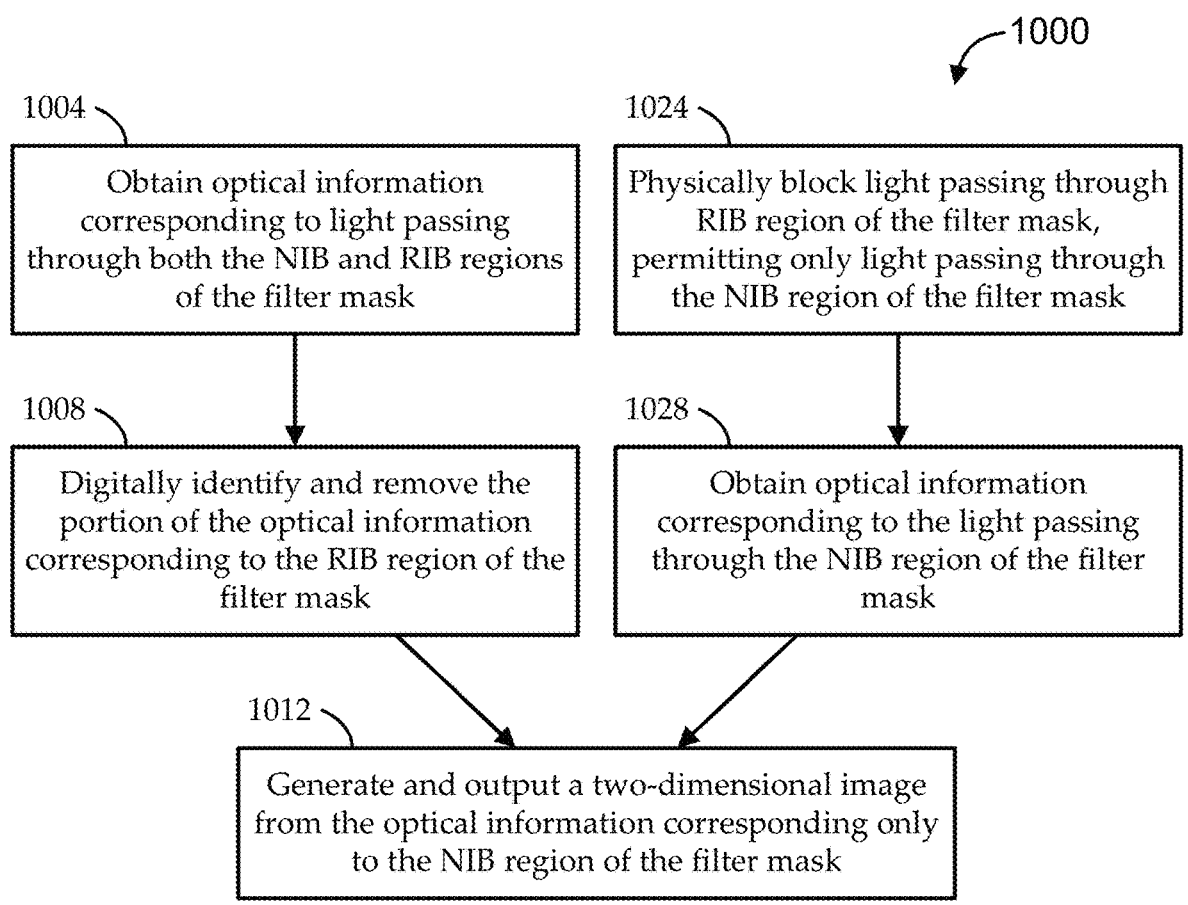
FIG. 10 shows a flow diagram of a method for normal imaging using embodiments of the passive three-dimensional imaging system described herein.

In some embodiments, the passive three-dimensional imaging system is incorporated into a system that also operates for normal imaging. For example, a camera of a smart phone, or the like, can be adapted (e.g., by integrating the filter mask 120 into the camera's lens assembly) to provide the passive three-dimensional imaging features described herein. FIG. 10 shows a flow diagram of a method 1000 for normal imaging using embodiments of the passive three-dimensional imaging system described herein. Some embodiments of the method 1000 begin at stage 1004 by obtaining optical information corresponding to light passing through both NIB and RIB regions of a filter mask. At stage 1008, embodiments can digitally identify and remove the portion of the optical information corresponding to the RIB region of the filter mask. For example, the optical information is received as detected interactions between the light components and photodetectors of an image sensor, and digital filtering and/or other techniques can be used to extract only the normal light components from the received optical information.

Other embodiments of the method 1000 begin at stage 1024 by physically blocking light passing through the RIB region of the filter mask, permitting only light passing through the NIB region of the filter mask. For example, a mechanical aperture, or the like, can be used to block light from passing through any region of the filter mask other than the NIB region. At stage 1028, embodiments can obtain optical information corresponding to the light passing through the NIB region of the filter mask. For example, only the normal light components pass through the filter mask, and the optical information is received as detected interactions between the normal light components and photodetectors of the image sensor.

At stage 1012, embodiments can generate and output a two-dimensional image from the optical information corresponding only to the NIB region of the filter mask. In embodiments beginning with stages 1004 and 1008, the optical information used in stage 1012 corresponds to the normal light component information digitally identified in stage 1008. In embodiments beginning with stages 1024 and 1028, the optical information used in stage 1012 corresponds to the normal light components obtained at stage 1028 after physical blocking of other light components in stage 1024.

Referential Image Blurring with Spotted Reference Illumination

Some embodiments described above rely on detection of definable features across the reference and normal images in order to detect and measure blurring. For example, if the scene object is a cube some distance away, the edges of the cube can be detected in both the reference and normal images by image processing, and the distance between the detected edge in the two images can be used to measure the amount of blurring (and, thereby, to compute the object distance for that edge). In many instances, however, a scene object includes sufficiently expansive regions having no detectable structures (e.g., definable edges, features, etc.), such that a comparison of reference and normal images does not provide blurring information in those regions. For example, if the scene object is a person's face, reference-to-normal blurring techniques can be used to compute object distance for certain facial features, such as detectable structural edges or sufficiently sharp changes in contrast on the person's ears, eyes, eyebrows, lips, etc. However, there may be no features to detect across the persons entire cheeks, forehead, etc. (e.g., absent freckles, wrinkles, or other detectable features). Similarly, depending on the selection of reference and normal light components, certain features may appear in one image that do not appear in the other (e.g., some features may not be discernable in a near-infrared image of a face that are discernable in a visible-spectrum image of the face).

Some embodiments described herein provide novel techniques for 3D image sensing based on passive optical techniques, particularly involving referential imaging blurring with spotted illumination. The spotted illumination effectively produces detectable features in locations that otherwise do not have such features. For example, some embodiments described above (e.g., with reference to FIG. 9B) can add reference illumination to a scene, including by projecting reference illumination onto the scene object. In some implementations discussed there, the additional illumination is used to add reference illumination to the scene to improve detection particularly where there is otherwise an undesirably small amount of ambient reference illumination. For example, flooding the scene with reference illumination can improve the reference image contrast, which can improve the reliability of blurring measurements. In other implementations discussed there, the additional illumination is used to add features to the scene to improve detection in areas that otherwise do not have sufficient features for object distance detection. For example, a spot can be projected onto a scene object using illumination having both reference and normal light components. The spot will appear in both the reference and normal images and will manifest blurring, which can be used to measure object distance at the spot location.

Embodiments described in this section add reference illumination to the scene, particularly using spotted illumination. As used herein, "spotted illumination" is intended to include any suitable type of illumination that forms a shape-defined illumination pattern when projected onto a scene object. For example, projecting spotted illumination can involve projecting a substantially collimated beam of light to illuminate a location on the scene object with a conic cross-section-shaped spot. As another example, projecting spotted illumination can involve projecting a substantially collimated beam of light with diffraction to illuminate a location on the scene object with a line-shaped spot. In some implementations, the spotted illumination includes multiple spots, and/or is scanned across some or all of a field of view, to effectively provide object distance measurement information at multiple locations.

In general, such embodiments can include a filter mask having multiple, spatially separated bandpass regions for passing through reflected light components from the spotted illumination. The reflected light components are focused onto an image sensor through the multiple bandpass regions of the filter mask, thereby reaching the image sensor along different paths. When the scene object is some calibration object distance away from the image sensor (or the filter mask, the lens, etc.), the different paths tend to converge at the image sensor, such that multiple detected images of the spotted illumination completely (or substantially completely) overlap. As the scene object is moved away from the calibration object distance, the overall focal distance changes; such that the different paths converge in front of or behind the image sensor, and the multiple detected images do not overlap. The amount of overlap (or non-overlap, or "blurring," as described herein) has a deterministic relationship to the object distance of the scene object, and detection of the blurring can be used as an indicator of object distance.

FIGS. 11A and 11B show a passive 3D image sensing environment 1100 using spotted illumination, according to various embodiments. The environment 1100 can be an implementation or variation of the environment 100 of FIGS. 1A and 1B. As in FIGS. 1A and 1B, the environment 1100 includes a lens assembly 110, an image sensor 130, a filter mask 120, and a processor 150 (not shown). The environment 1100 also includes a spotted illuminator 1115 to project spotted illumination into a scene and/or onto a scene object 105. The lens assembly 110 can include the filter mask 120. For example, while the filter mask 120 is shown in FIGS. 1A and 1B as adjacent to a single convex lens, the lens assembly 110 can includes a number of discrete lens components (e.g., convex and/or convex lenses, mirrors, etc.) with the filter mask 120 disposed among the components (e.g., at a common aperture stop). Further, the lens assembly 110 can include additional elements, such as a mechanical aperture.

Embodiments of the filter mask 120 are illustrated as including two reference imaging bandpass (RIB) regions 1124 that are spatially separated from each other. The RIB regions 1124 can be implemented in the same manner as those described in other implementations above. Though not shown, embodiments of the filter mask 120 can further include one or more normal imaging bandpass (NIB) regions, such as NIB region 122 of FIGS. 1A and 1B. In such implementations, as described above, any NIB region(s) and the RIB regions 1124 pass through light components that are optically distinguishable in any suitable manner (e.g., in polarization, frequency band, brightness, etc.). Regions of the filter mask 120 that are not RIB regions 1124 (or NIB regions) are substantially opaque at least with respect to the light components of interest. In the illustrated implementation, the RIB regions 1124 pass through at least particular light components, and the remainder of the filter mask 120 (e.g., a substrate material) substantially blocks at least those particular light components. For example, the RIB regions 1124 are configured as optical bandpass filters for light in the near-infrared spectrum, and the substrate material making up the remainder of the filter mask 120 is either opaque, or acts substantially as an optical bandstop filter to light in the near-infrared spectrum. In some implementations, the RIB regions 1124 are configured to pass through light of a particular human-visible wavelength. In other implementations, the RIB regions 1124 are configured to pass through any light in the human-visible portion of the optical spectrum.

The multiple RIB regions 1124 are spatially distinct regions of the filter mask 120. As such, when light passes through the lens assembly 110 and the filter mask 120, light rays pass through a first of the RIB regions 1124 along a first set of paths, and light rays pass through a second of the RIB regions 1124 along a second set of paths. The illustrated implementation assumes the focal length is the same along the multiple paths, as the same light components are being focused by the same lens assembly 110. However, in some implementations, the focal lengths along the multiple paths are different, for example, due to aberration in the lens assembly 110. Two RIB regions 1124 are illustrated, resulting in two focal paths both focusing their respective portion of the reflected light components to a common focal plane 1145. The common focal plane 1145 can be the reference focal plane 145 of FIGS. 1A and 1B. As illustrated, light components that originate from the scene object 105 (e.g., reflecting off of a surface of the scene object 105 after spotted illumination is projected onto the scene object 105 by the spotted illuminator 1115) and pass through the RIB regions 1124 are focused by the lens assembly 110 onto the reference focal plane 1145.

FIGS. 11A and 11B show a scene object 105 located some object distance 107 from the filter mask 120. In particular, FIG. 11A shows the scene object 105 located at a closer object distance 107a, and FIG. 11A shows the scene object 105 located at a farther object distance 107b. As noted above, the object distance can refer to the distance of the scene object 105 from any suitable reference point, such as any particular lens assembly 110 component, the filter mask 120, the image sensor 130, etc. With the scene object 105 located at the first object distance 107a, the reflected light components are focused by the lens assembly 110 to a first reference focal plane 1145a, which is past a detection plane 141 of the image sensor 130 by a relatively large detection offset 1140a. When the light components reach the detection plane 141 of the image sensor 130, an image of the spotted illumination can be detected. A respective image can be produced responsive to the light components traveling each path (e.g., two separate focal paths can manifest two separate images of the same spotted illumination). Because the two focal paths reach the detection plane 141 prior to converging at the reference focal plane 1145, the two images 1134a of the spotted illumination do not form in the same location on the image sensor 130. As described above, the amount of non-overlap can be referred to as "blurring" and can be detected, measured, and/or otherwise described by a blurring value, or blurring distance 146.

For the sake of comparison, FIG. 11B shows the scene object 105 located at further object distance 107b, at which position the reflected light components are focused by the lens assembly 110 to a second reference focal plane 1145b. In the illustrated implementation, the second reference focal plane 1145b is past the detection plane 141 of the image sensor 130 by a detection offset 1140b that is smaller than the detection offset 1140a of FIG. 11A. When the light components reach the detection plane 141 of the image sensor 130, multiple (e.g., two) images of the spotted illumination can form by virtue of the light components traveling separate focal paths. As in FIG. 11A, two focal paths reach the detection plane 141 prior to converging at the reference focal plane 1145, such that the two formed images 1134b of the spotted illumination do not fully overlap at the image sensor 130. However, because the detection offset 1140b is smaller, the amount of blurring (non-overlap) is less. This smaller amount of blurring can be detected by comparing the relatively small blurring distance 146b of FIG. 11B to the relatively large blurring distance 146a of FIG. 11A.

Though not explicitly shown, there is some object distance at which the blurring distance 146 is substantially zero. This can be considered as a calibration distance in some implementations. In some embodiments, the calibration distance is fixed. For example, such embodiments may be configured with a fixed separation between the lens assembly 110 and the image sensor 130, such that the calibration distance is effectively defined by that fixed separation. In other embodiments, the calibration distance is not fixed. Some embodiments described herein provide for auto-focusing and/or manual focusing, and such focusing can effectively change the focal length of the lens assembly 110 with reference to the image sensor 130. In some implementations, such focusing can involve mechanically changing moving components of the lens assembly 110 and/or image sensor 130 to physically adjust the separation distance between them. This type of focusing can, for example, maintain the same focal distance (e.g., the same distance between the lens assembly 110 and the reference focal plane 1145), while changing the location of the detection plane 141 relative to the lens assembly 110 (e.g., moving the detection plane 141 closer to, or farther from, any particular lens component, the filter mask 120, etc.). In other implementations, such focusing can involve adjusting components of the lens assembly 110 (e.g., adjusting the effective focusing power of lens components) to change the effective focal length. This type of focusing can, for example, change the focal distance (e.g., increase or decrease the distance between the lens assembly 110 and the reference focal plane 1145), while maintaining the same distance between the detection plane 141 and the lens assembly 110. With any of these implementations, the relationship between object distance 107 and blurring distance 146 can change with changes in focus.

In some embodiments, techniques described herein with reference to calibration for blurring between normal and reference images can be similarly applied to calibrate the system for blurring between multiple reference images. For example, different calibration relationships can be pre-calibrated and stored in memory, and an appropriate calibration value (and other related correlations between object distance 107 and blurring distance 146) can be retrieved and used responsive to any change in focus (or at any suitable time). Some embodiments described above noted that, when detecting blurring between images corresponding to different types of light components (e.g., between normal and reference images), the amount of blurring and relative positions between the images can both be informative. For example, as described with reference to FIG. 2, object distances 107 farther than a calibration distance manifest as the "blue" image being offset to the right relative to the red image, while object distances 107 closer than a calibration distance resulted in the "blue" image being offset to the left relative to the red image. In spotted illumination embodiments, the same light components are traveling along different paths to form the multiple images. If the images are captured concurrently, there may be no practical way to discern which image corresponds to which path, such that some implementations may not be able to distinguish between whether an object distance 107 is closer than the calibration distant, or farther from the calibration distance. Some implementations calibrate according to a sufficiently large (or small) calibration distance, such that all other object distances 107 can be assumed to be removed from that calibration distance in only one direction (e.g., the calibration condition is focused practically at infinity, so any measured distance must be closer that the calibration distance). Other implementations can use mechanical apertures, electro-optical apertures (e.g., with MEMS, transparent LCDs, etc.), or other suitable techniques to enable separate (i.e., non-concurrent) capture of the multiple images. For example, a first image is captured at a first time corresponding to the light components being permitted to pass through a first RIB region 1124, a second image is captured at a second time corresponding to the light components being permitted to pass through a second RIB region 1124. Other implementations can use a combination of reference-to-normal blurring detection and spotted illumination blurring detection to determine object distance 107. For example, reference-to-normal blurring detection can be used to map a first set of features from detectable features, spotted illumination blurring can be used to produce and map a second set of features, and the context provided by the first set of features can be used as a set of boundary values to bound solutions obtained from spotted illumination blurring (e.g., if a calibration location is 18 inches away, and reference-to-normal blurring detection produces two measurement points at 13 inches and 15 inches away, an illuminated spot located between those two measurement points can be assumed to be on the near side of the calibration location).

The spotted illuminator 1115 can include any suitable components for providing spotted illumination according to embodiments described herein, such as an illumination source; and optics to focus, intensify, direct, filter, diffract, or otherwise configure the illumination. In some implementations, the spotted illuminator 1115 produces non-collimated and/or non-coherent light, and includes lenses and/or other optics to focus the produced light to form an illuminated spot on a surface of the scene object 105. For example, the illumination source of the spotted illuminator 1115 includes an infrared light emitting diode (LED) to project near-infrared illumination through a lens. In other implementations, the spotted illuminator 1115 produces collimated and/or coherent light to form an illuminated spot on a surface of the scene object 105. For example, the illumination source of the spotted illuminator 1115 includes a laser diode. In some implementations, additional optics are used to shape the spotted illumination. For example, output of a laser diode can be diffracted to form spotted illumination shaped as lines across a surface of the scene object 105.

In some embodiments, the spotted illuminator 1115 is configured to direct the spotted illumination to multiple locations in the scene. Some embodiments include mechanical positioning elements to redirect the output of the illumination source or sources of the spotted illuminator 1115, such as by mechanically tilting the illumination source(s), by using MEMS optics, etc. Other embodiments can use phasing and/or other techniques to direct the spotted illumination. In some embodiments, the directing can position the spotted illumination in a number of fixed locations, such as by using multiple discrete illuminators, by using multiple selectable illumination configurations, etc. In other embodiments, the directing can effectively scan the spotted illumination across some or all of a field of view. For example, the scanning can be along a linear path (e.g., horizontally, vertically, or diagonally), along a curved path, in a rasterized pattern across multiple rows and/or columns, etc. Some embodiments use multiple illuminators or other patterns of illumination. For example, the spotted illumination can effectively produce a grid of points and/or lines in a field of view. Operation of the spotted illuminator 1115 can be directed in any suitable manner. For example, the spotted illuminator 1115 can be coupled with and directed by the processor 150 (not shown).

Figure 12:
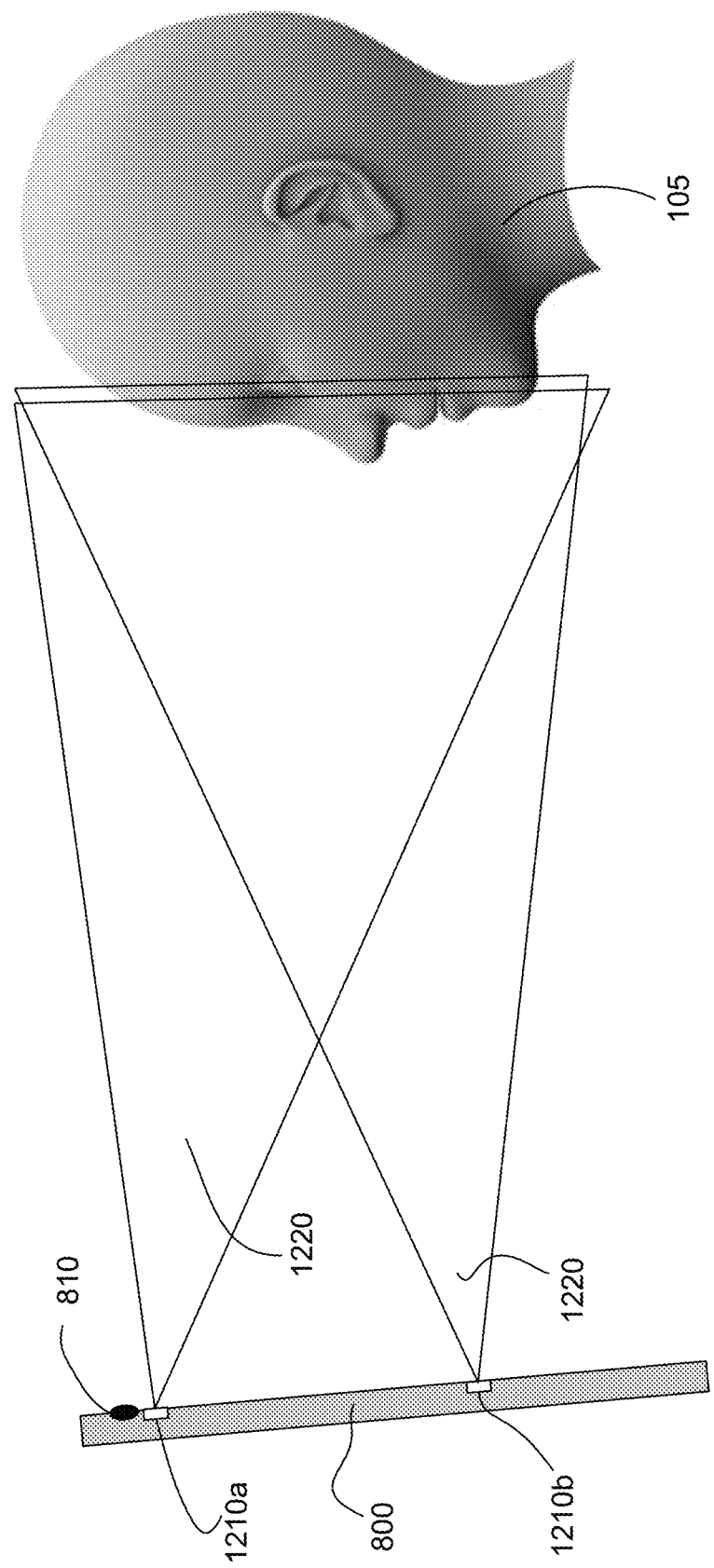
FIG. 12 shows an illustrative embodiment of a portable personal electronic device (PPED) having one or more illumination sources of a spotted illuminator, according to various embodiments.

FIG. 12 shows an illustrative embodiment of a portable personal electronic device (PPED) 800 having one or more illumination sources 1210 of a spotted illuminator 1115, according to various embodiments. The PPED 800 can be an implementation of PPED 800 of FIG. 8, including one or more digital imaging systems 810 configured to implement referential image blurring with spotted reference illumination, as described herein. As illustrated, one or more illumination sources 1210 can be configured to illuminate a scene object 105 in the field of view of the digital imaging system(s) 810. Each of the illumination sources 1210 can have an associated illumination field. In some embodiments, one or more of the illumination sources 1210 is configured to flood the illumination field with reference illumination. In other embodiments, one or more of the illumination sources 1210 is configured to provide spotted illumination, such as by forming an illuminated spot (e.g., as an elliptical spot, as a line, etc.) on one or more locations of the scene object 105.

While multiple illumination sources 1210 are shown, a single illumination source 1210 can be used. For example, embodiments do not rely on triangulation for depth measurement. As such, the multiple illumination sources 1210 illustrated in FIG. 12 can be considered as multiple optional illumination sources 1210, or as multiple alternative locations for a single illumination source 1210. In some embodiments, multiple illumination sources 1210 are used to provide additional features. In one such embodiment, each of multiple illumination sources 1210 can be configured to generate illumination (e.g., reference illumination) having different optical components. In another such embodiment, the illumination fields of multiple illumination sources 1210 do not fully overlap, such that the illumination sources 1210 can jointly cover a larger illumination field.

Figure 13:
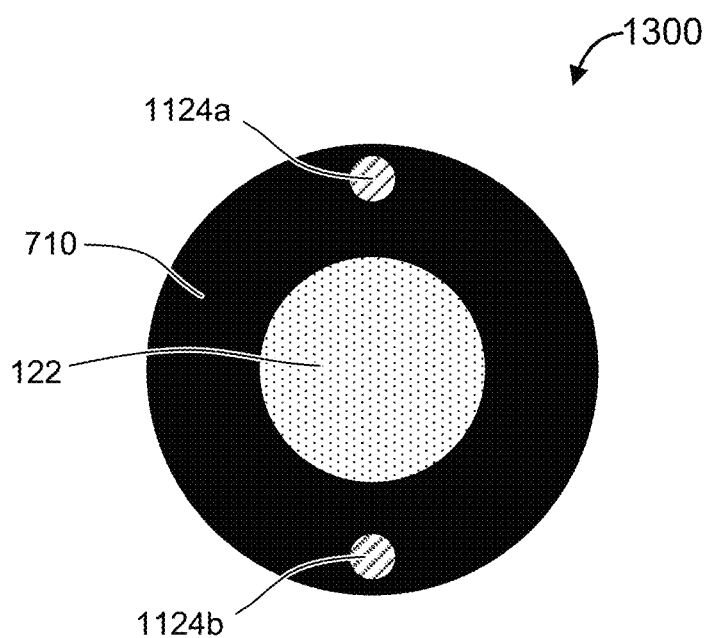
FIG. 13 shows an illustrative implementation of a filter mask, according to various embodiments.

FIG. 13 shows an illustrative implementation of a filter mask 1300, according to various embodiments. The filter mask 1300 can be an implementation of the filter mask 120 described with reference to other embodiments herein (e.g., and a variation of the filter mask 700 of FIG. 7A). In the illustrative implementation, the filter mask 700 includes a NIB region 122 and two RIB regions 1124. The NIB region 122 is implemented as a first circular region generally surrounded by an isolation region 710. Each RIB region 1124 is implemented as a small circular region separate and distinct from the NIB region 122 and any other RIB region 1124. In some embodiments, the RIB regions 1124 are positioned to maximize (to a practical extent) spatial separation between each other (e.g., and between them and the NIB region 122). Embodiments of the isolation region 710 separate, and are optically distinguishable from, the NIB region 122 and the RIB region 124. For example, the isolation region 720 can be an opaque substrate into which the NIB region 122 and the RIB regions 1124 are formed or otherwise integrated. The locations, shapes, relative sizes, and other characteristics of the filter mask 1300 regions can be modified to optimize certain features.

In some embodiments, the NIB region 122 is configured to pass through human-visible light (e.g., in the bed-green-blue spectrum), and the RIB regions 1124 are configured to pass through other than human-visible light (e.g., in the near-infrared spectrum). As described with reference to FIG. 7, the NIB region 122 can be configured with a relatively small aperture diameter to establish sufficient depth of field for high-quality normal imaging. In some such embodiments, additional illumination is added to flood the scene with reference illumination and increase detection contrast.

Figure 14:
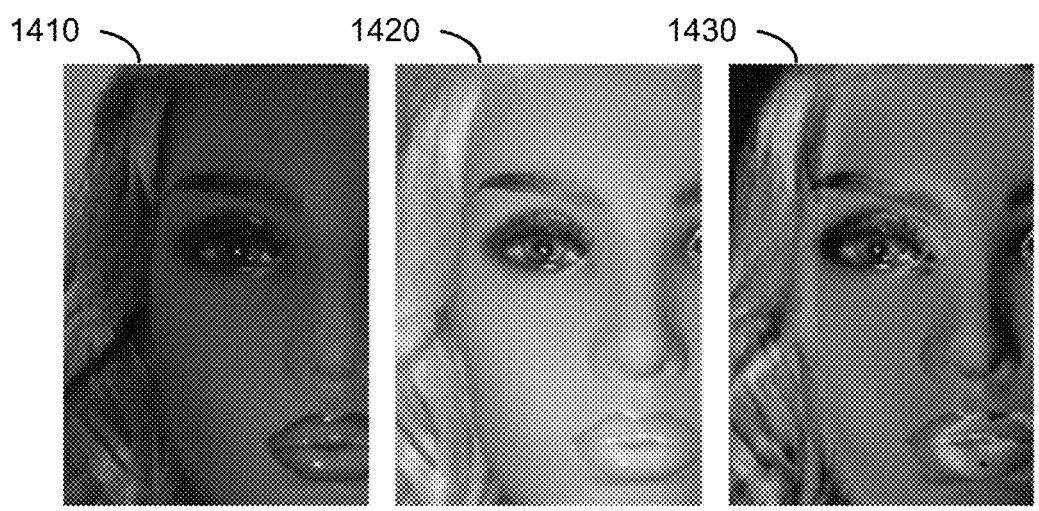
FIG. 14 shows a series of images to illustrate an embodiment of referential image blurring with flooded reference illumination

Turning briefly to FIG. 14, a series of images is shown to illustrate an embodiment of referential image blurring with flooded reference illumination. A first image 1410 illustrates an image of a model's face obtained under normal imaging conditions with weak ambient reference illumination. The second image 1420 illustrates an image of a model's face obtained while flooding the scene with reference illumination. Image 1420 represents a superposition of normal and reference light components. For example, referring to the filter mask 1300 of FIG. 13 and the aperture 730 of FIGS. 7B and 7C, image 1410 can represent a condition of imaging using only the NIB region 122 of the filter mask 1300 (e.g., with the aperture 730 partially closed to block the RIB regions 1124), and image 1420 can represent a condition of imaging using the NIB region 122 and the RIB regions 1124 (e.g., with the aperture fully open). Notably, there is a clearly detectable difference between image 1410 and image 1420, indicating that there is weak ambient reference illumination absent the flooding of the scene with additional reference illumination. Such a recognition can be exploited by certain implementations to detect whether there is benefit from flooding the scene with reference illumination as part of the blurring detection.

A third image 1430 illustrates a result of subtracting image 1410 from image 1420 (i.e., subtracting the normal imaging components from the reference imaging components). In image 1430, a double reference image is clearly visible. As described above, this double image results from the reference light components passing through the spatially separate and distinct RIB regions 1124 of the filter mask 1300. Blurring is evident at certain feature boundary locations, such as at the edge of the face, eyes, nose, lips, etc. It can be seen from image 1430 that blurring (and corresponding depth information) is not clearly evident in large regions across the model's cheeks, forehead, etc.

Figure 15:
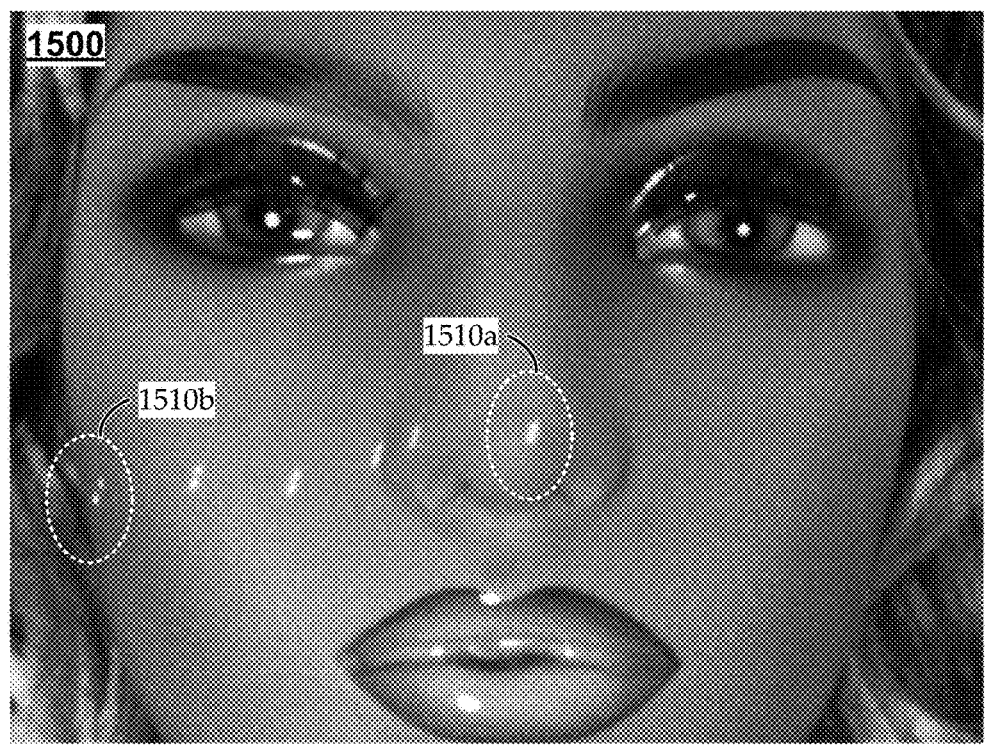
FIG. 15 shows an illustrative image of a scene object being illuminated with spotted illumination for use in referential image blurring with spotted reference illumination.

As described herein, spotted illumination can be used to effectively add detectable features in regions where blurring is not otherwise evident. FIG. 15 shows an illustrative image 1500 of a scene object being illuminated with spotted illumination for use in referential image blurring with spotted reference illumination. The image 1500 is produced by illuminating a scene object (e.g., the same model's face imaged in FIG. 14) with spotted illumination. The spotted illumination is a single beam of illumination forming a single illuminated spot having a substantially conic cross-sectional shape, and the illumination is scanned across the scene object over multiple frame times of a time window. The image 1500 represents a superposition of imaging information obtained over multiple of those frame times, such that the spot formed by the spotted illumination is in multiple corresponding locations. Though the spotted illumination was projected as a single beam to form a single illuminated spot on the model's face in each frame time, the image 1500 illustrates a pair of spots in each location. As described herein, this pair of spots results from the reference light components passing through the spatially separate and distinct RIB regions 1124 of the filter mask 1300. In the illustrated case, it can be seen that the system is calibrated according to a relatively close calibration distance. A first spot location 1510a near the tip of the nose is relatively close to the calibration distance, such that there is a relatively small amount of blurring at that spot location (i.e., a small amount of non-overlap). In comparison, it can be seen that a second spot location 1510b near an edge of the cheek is farther away from the calibration distance, such that there is a relatively large amount of blurring at that spot location (i.e., a larger amount of non-overlap).

Returning to FIG. 14, in some embodiments, the RIB regions 1124 are configured to pass through human-visible light (e.g., in the bed-green-blue spectrum). In some such embodiments, the NIB region 122 is configured to pass through other than human-visible light (e.g., in the near-infrared spectrum). In other such embodiments, the NIB region 122 passes through a wide band of human-visible light (e.g., the entire visible spectrum), while the RIB regions 1124 pass through only a particular color, polarization, or other subset of light components in the visible spectrum.

Figure 16:
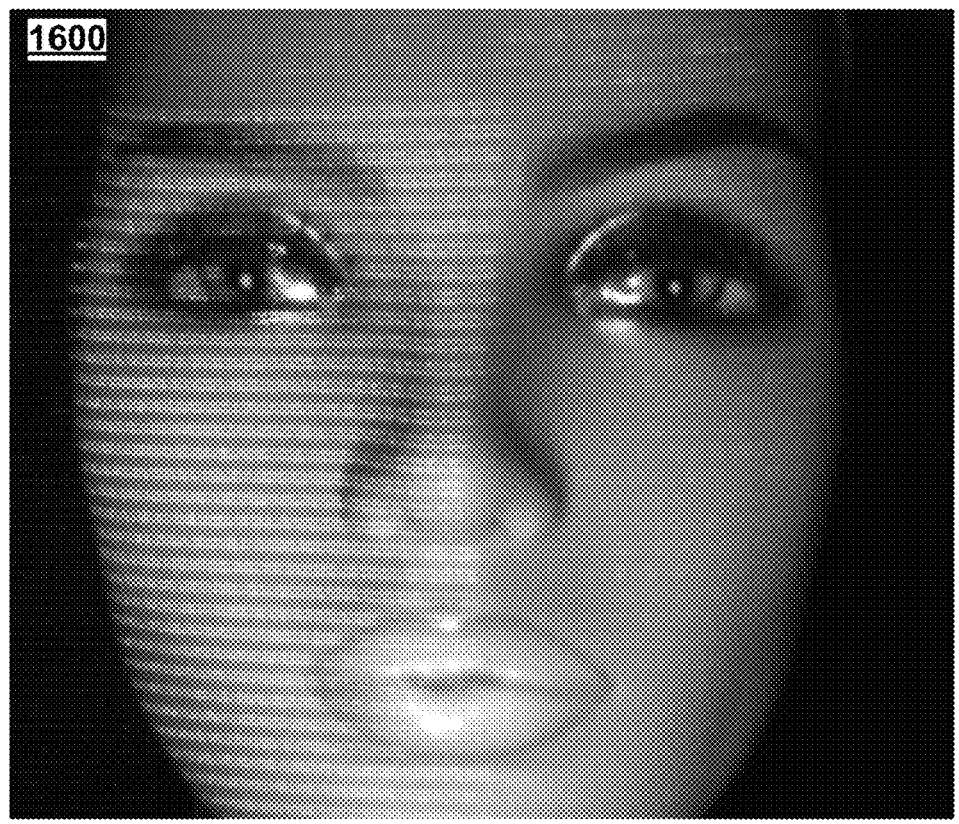
FIG. 16 shows an illustrative image of a scene object being illuminated with diffracted spotted illumination for use in referential image blurring with spotted reference illumination.

For example, FIG. 16 shows an illustrative image 1600 of a scene object being illuminated with diffracted spotted illumination for use in referential image blurring with spotted reference illumination. The image 1600 is produced by using a diffraction optical element to diffract a green laser beam to form parallel lines. The lines are projected as spotted illumination onto the scene object. The lines can be scanned to different locations on the model's face over multiple frame times of a time window, as shown (i.e., the image 1600 represents a superposition of imaging information obtained over multiple of those frame times). Though the spotted illumination was projected as a single line in each frame time, the image 1600 illustrates a pair of lines in each location. As described herein, reflected light components (e.g., a particular narrow band of green light) are received via separate paths through the RIB regions 1124 of the filter mask 1300, thereby forming the multiple images with blurring at the image sensor. In the illustrated case, it can be seen that the system is calibrated according to a relatively distant calibration distance. In locations closer to the tip of the model's nose (i.e., locations relatively close to the image sensor and relatively far from the calibration distance), there is a relatively large amount of blurring (i.e., a large amount of non-overlap). In comparison, it can be seen that in locations closer to the outer edge of the cheek (i.e., locations relatively far from the image sensor and relatively close to the calibration distance), there is a relatively small amount of blurring (i.e., a smaller amount of non-overlap).

Figure 17:
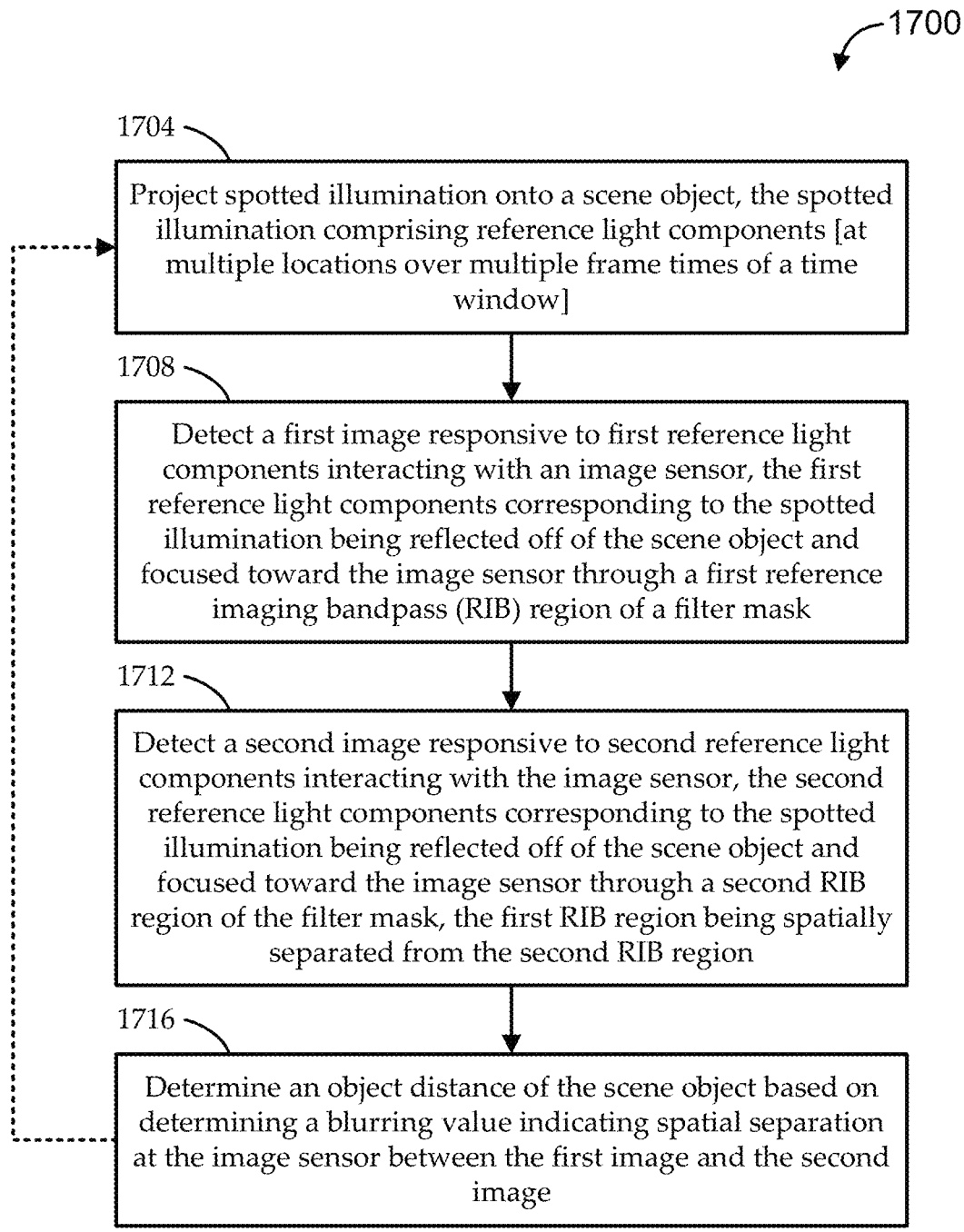
FIG. 17 shows a flow diagram of an illustrative method for referential image blurring with spotted reference illumination, according to various embodiments.

FIG. 17 shows a flow diagram of an illustrative method 1700 for referential image blurring with spotted reference illumination, according to various embodiments. Embodiments of the method 1700 begin at stage 1704 by projecting spotted illumination onto a scene object, the spotted illumination including reference light components. At stage 1708, embodiments can detect a first image responsive to first reference light components interacting with an image sensor. The first reference light components correspond to the spotted illumination being reflected off of the scene object and focused toward the image sensor through a first reference imaging bandpass (RIB) region of a filter mask. At stage 1712, embodiments can detect a second image responsive to second reference light components interacting with the image sensor. The second reference light components correspond to the same spotted illumination being reflected off of the scene object and focused toward the image sensor through a second RIB region of the filter mask. The first RIB region is spatially separated from the second RIB region. At stage 1716, embodiments can determine an object distance of the scene object based on determining a blurring value indicating spatial separation at the image sensor between the first image and the second image.

In some embodiments, the projecting at stage 1704 involves scanning the spotted illumination across at least a portion of the scene object to project the spotted illumination onto a plurality of locations of the scene object over a time window. In some such embodiments, at each frame time of a multiple of frame times within the time window, responsive to the spotted illumination being projected onto a respective one of the plurality of locations of the scene object in the frame time: the detecting at stage 1708 can include detecting a respective first image for the frame time; the detecting at stage 1712 can include detecting a respective second image for the frame time; and the determining at stage 1716 can include determining a respective object distance for the frame time based on determining a respective blurring value indicating spatial separation at the image sensor between the respective first image and the respective second image for the frame time. Such embodiments can involve iteration through stages of the method 1700 as indicated by the dashed arrow returning from stage 1716 to stage 1704.

Figure 18:
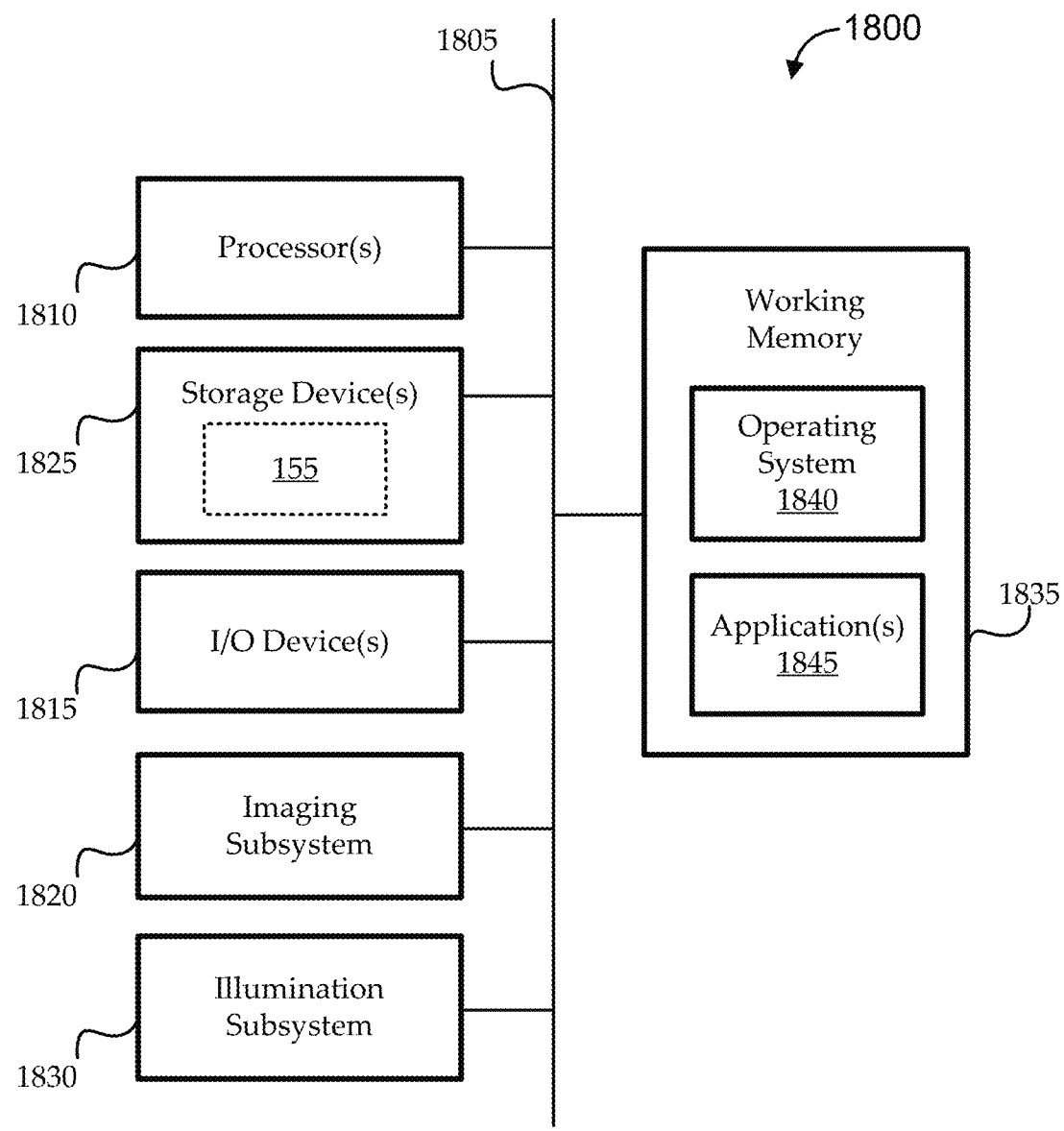
FIG. 18 provides a schematic illustration of one embodiment of a computer system that can implement various system components and/or perform various steps of methods provided by various embodiments.

FIG. 18 provides a schematic illustration of one embodiment of a computer system 1800 that can implement various system components and/or perform various steps of methods provided by various embodiments. It should be noted that FIG. 18 is meant only to provide a generalized illustration of various components, any or all of which may be utilized as appropriate. FIG. 18, therefore, broadly illustrates how individual system elements may be implemented in a relatively separated or relatively more integrated manner.

The computer system 1800 is shown including hardware elements that can be electrically coupled via a bus 1805 (or may otherwise be in communication, as appropriate). The hardware elements may include one or more processors 1810, including, without limitation, one or more general-purpose processors and/or one or more special-purpose processors (such as digital signal processing chips, graphics acceleration processors, video decoders, and/or the like). For example, processors 1810 can implement processor 150 shown in FIGS. 1A and 1B. Some embodiments include one or more input/output (I/O) devices 1815. In some implementations, the I/O devices 1815 include human-interface devices, such as buttons, switches, keypads, indicators, displays, etc. In other implementations, the I/O devices 1815 include circuit-level devices, such as pins, dip-switches, etc. In some implementations, the computer system 1800 is a server computer configured to interface with additional computers and/or devices, such that the I/O devices 1815 include various physical and/or logical interfaces (e.g., ports, etc.) to facilitate hardware-to-hardware coupling, interaction, control, etc.

The computer system 1800 may further include (and/or be in communication with) one or more non-transitory storage devices 1825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 1825 include memory 155 for storing calibration information, and/or any other suitable information and/or instructions for implementing features described herein.

The computer system 1800 can also include, or be in communication with, any other components described herein. In some embodiments, the computer system 1800 includes an imaging subsystem 1820. The imaging subsystem 1820 can include the image sensor 130 and any supporting components. In some embodiments, the computer system 1800 includes an illumination subsystem 1830. The illumination subsystem 1830 can include any suitable illumination sources for projecting normal illumination and/or reference illumination into a field of view of the imaging subsystem 1820, and any supporting components. In some such embodiments, the illumination subsystem 1830 includes one or more of the illumination sources 1210 to provide reference illumination flooding and/or to provide one or more types of spotted illumination. Some embodiments can include additional subsystems, such as a communications subsystem (not shown) to communicatively couple with other systems, networks, etc.

Embodiments of the computer system 1800 can further include a working memory 1835, which can include a RAM or ROM device, as described herein. The computer system 1800 also can include software elements, shown as currently being located within the working memory 1835, including an operating system 1840, device drivers, executable libraries, and/or other code, such as one or more application programs 1845, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. A set of these instructions and/or codes can be stored on a non-transitory computer-readable storage medium, such as the non-transitory storage device(s) 1825 described above. In some cases, the storage medium can be incorporated within a computer system, such as computer system 1800. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 1800 and/or can take the form of source and/or installable code, which, upon compilation and/or installation on the computer system 1800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 1800) to perform methods in accordance with various embodiments of the invention. According to a set of embodiments, some or all of the procedures of such methods are performed by the computer system 1800 in response to processor 1810 executing one or more sequences of one or more instructions (which can be incorporated into the operating system 1840 and/or other code, such as an application program 1845) contained in the working memory 1835. Such instructions may be read into the working memory 1835 from another computer-readable medium, such as one or more of the non-transitory storage device(s) 1825. Merely by way of example, execution of the sequences of instructions contained in the working memory 1835 can cause the processor(s) 1810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1800, various computer-readable media can be involved in providing instructions/code to processor(s) 1810 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1825. Volatile media include, without limitation, dynamic memory, such as the working memory 1835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 1810 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 1800.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A passive three-dimensional imaging system comprising:
    an illumination source to project spotted illumination onto a scene object, the spotted illumination comprising reference light components;
    a lens assembly comprising:
        a filter mask having a first reference imaging bandpass (RIB) region and a second RIB region spatially separated by a portion of a substrate such that the first and second RIB regions lie in spatially distinct regions along a filter plane of the filter mask; and
        a lens configured to focus the reference light components as reflected off of the scene object through the filter mask, such that a first portion of the reference light components is focused onto a first image plane along a first path through the first RIB region, and a second portion of the reference light components is focused onto a second image plane along a second path through the second RIB region, the second image plane offset from the first image plane by an offset amount that changes as a function of an object distance of the scene object from the lens assembly;
    an image sensor comprising a plurality of photodetector elements defining a detection plane and configured to detect a first image of the spotted illumination responsive to the first portion of the reference light components received by the plurality of photodetector elements after being focused through the filter mask, and to detect a second image of the spotted illumination responsive to the second portion of the reference light components received by the plurality of photodetector elements after being focused through the filter mask, the detection plane being removed from the filter plane; and
    a processor configured to determine an object distance of the scene object based on determining a blurring value and a spatial separation between the first and second RIB regions, the blurring value indicating an amount of non-overlap between the first image and the second image due to the offset amount.

2. The system of claim 1, wherein the illumination source is configured to scan the spotted illumination across at least a portion of the scene object to project the spotted illumination onto a plurality of locations of the scene object over a time window.

3. The system of claim 2, wherein:
    the image sensor is configured, at each of a plurality of frame times within the time window, to detect a respective first image and to detect a respective second image of the spotted illumination as projected onto a respective one of the plurality of locations of the scene object corresponding to the frame time; and
    the processor is configured to determine multiple object distances for the scene object based on determining respective blurring value indicating spatial separation at the image sensor between each respective first image and each respective second image for at least a portion of the frame times.

4. The system of claim 1, wherein the illumination source is to project the spotted illumination to form one or more elliptical spots of illumination of the scene object.

5. The system of claim 1, wherein the illumination source is to project the spotted illumination to form one or more lines of illumination on the scene object by diffracting coherent source illumination.

6. The system of claim 1, wherein the lens assembly is positionable relative to the image sensor, so that:
the blurring value indicates substantially no spatial separation at the image sensor between the first image and the second image responsive to the scene object being positioned at a calibration object distance; and
the blurring value indicates increasing spatial separation at the image sensor between the first image and the second image responsive to the scene object being increasing farther from the calibration object distance.

7. The system of claim 1, wherein:
the lens comprises a plurality of lens components that define a common aperture plane; and
the filter mask is positioned to filter the reference light components substantially at the common aperture plane.

8. The system of claim 1, wherein:
the filter mask further has a normal imaging bandpass (NIB) region separate and spaced away from the first and second RIB regions;
the first and second RIB regions are configured to permit passage of the reference light components and to impede passage of normal light components that are optically distinguishable from the reference light components; and
the NIB region is configured to permit passage of the normal light components and to impede passage of the reference light components.

9. The system of claim 8, wherein:
the reference light components are in a reference illumination band;
the normal light components are in a normal illumination band different from the reference illumination band;
the RIB region is configured as an optical bandpass filter for the reference illumination band and as an optical bandstop filter for the normal illumination band; and
the NIB region is configured as an optical bandpass filter for the normal illumination band and as an optical bandstop filter for the reference illumination band.

10. The system of claim 9, wherein:
one of the reference illumination band or the normal illumination band is in a human-visible portion of optical wavelengths; and
the other of the reference illumination band or the normal illumination band is outside the human-visible portion of optical wavelengths.

11. The system of claim 8, wherein:
the lens is configured to focus the reference light components through the first and second RIB regions of the filter mask onto a reference image plane;
the lens is further configured to focus the normal light components through the NIB region of the filter mask onto a normal image plane;
the first image plane and the second image plane have positions that change as a function of the object distance;

the image sensor is further configured to detect a third image of the scene object responsive to detection of the normal light components; and
the processor is further configured to determine the object distance based on determining a blurring value indicating spatial separation at the image sensor between the third image and at least one of the first image or the second image.

12. The system of claim 8, wherein:
the NIB region is a central inner region of the filter mask surrounded by an outer region of the filter mask; and
the outer region of the filter mask comprises the first and second RIB regions and substantially opaque regions separating at least the NIB region from the first and second RIB regions.

13. The system of claim 12, wherein:
the lens assembly further comprises a mechanical aperture configured to operate in a normal aperture mode and a reference aperture mode, such that:
in the normal aperture mode, the mechanical aperture mechanically blocks passage of light through the first and second RIB regions while permitting passage of light through the NIB region; and
in the reference aperture mode, the mechanical aperture permits passage of light at least through the RIB region.

14. The system of claim 8, wherein the normal light components are optically distinguishable from the reference light components based at least on relative polarization or respective intensity.

15. A method for passive three-dimensional imaging, the method comprising:
projecting spotted illumination onto a scene object, the spotted illumination comprising reference light components;
detecting a first image responsive to first reference light components interacting with an image sensor, the first reference light components corresponding to the spotted illumination being reflected off of the scene object and focused toward the image sensor onto a first focal plane through a first reference imaging bandpass (RIB) region of a filter mask;
detecting a second image responsive to second reference light components interacting with the image sensor, the second reference light components corresponding to the spotted illumination being reflected off of the scene object and focused toward the image sensor onto a second focal plane through a second RIB region of the filter mask, the first and second RIB regions spatially separated by a portion of a substrate such that the first and second RIB regions lie in spatially distinct regions along a filter plane of the filter mask, the second focal plane being offset from the first focal plane by an offset amount that changes as a function of an object distance of the scene object from the filter plane;
computing a blurring value indicating an amount of non-overlap between the first image and the second image due to the offset amount; and
determining an object distance of the scene object as a function of the blurring value and an amount of spatial separation between the first and second RIB regions.

16. The method of claim 15, wherein the projecting comprises scanning the spotted illumination across at least a portion of the scene object to project the spotted illumination onto a plurality of locations of the scene object over a time window.

17. The method of claim 16, wherein, at each frame time of a plurality of frame times within the time window, responsive to the spotted illumination being projected onto a respective one of the plurality of locations of the scene object in the frame time:

the detecting the first image comprises detecting a respective first image for the frame time;

the detecting the second image comprises detecting a respective second image for the frame time; and the determining the object distance comprises determining a respective object distance for the frame time based on determining a respective blurring value indicating spatial separation at the image sensor between the respective first image and the respective second image for the frame time.

18. A system for passive three-dimensional imaging, the system comprising:

one or more processors; and non-transient memory having instructions stored thereon, which, when executed by the one or more processors, cause the one or more processors to perform steps comprising:

projecting spotted illumination onto a scene object, the spotted illumination comprising reference light components;

detecting a first image responsive to first reference light components interacting with an image sensor, the first reference light components corresponding to the spotted illumination being reflected off of the scene object and focused toward the image sensor onto a first focal plane through a first reference imaging bandpass (RIB) region of a filter mask;

detecting a second image responsive to second reference light components interacting with the image sensor, the second reference light components corresponding to the spotted illumination being reflected off of the scene object and focused toward the image sensor onto a second focal plane through a second RIB region of the filter mask, the first and second RIB regions spatially separated by a portion of a substrate such that the first and second RIB regions lie in spatially distinct regions along a filter plane of the filter mask, the second focal plane being offset from the first focal plane by an offset amount that changes as a function of an object distance of the scene object from the filter plane;

computing a blurring value indicating an amount of non-overlap between the first image and the second image due to the offset amount; and determining an object distance of the scene object as a function of the blurring value and an amount of spatial separation between the first and second RIB regions.

19. The system of claim 18, wherein the projecting comprises scanning the spotted illumination across at least a portion of the scene object to project the spotted illumination onto a plurality of locations of the scene object over a time window.

20. The system of claim 19, wherein, at each frame time of a plurality of frame times within the time window, responsive to the spotted illumination being projected onto a respective one of the plurality of locations of the scene object in the frame time:

the detecting the first image comprises detecting a respective first image for the frame time;

the detecting the second image comprises detecting a respective second image for the frame time; and the determining the object distance comprises determining a respective object distance for the frame time based on determining a respective blurring value indicating spatial separation at the image sensor between the respective first image and the respective second image for the frame time.

* * * * *